United States Patent
Bazin

[19]

[11] Patent Number: 6,112,601
[45] Date of Patent: Sep. 5, 2000

[54] METHOD AND APPARATUS FOR MEASURING THE FLOW RATE OF A FLOWING FLUID

[75] Inventor: Alain Bazin, Villejuif, France

[73] Assignee: Schlumberger Industries, S.A., Montrouge, France

[21] Appl. No.: 09/216,596

[22] Filed: Dec. 18, 1998

Related U.S. Application Data

[63] Continuation of application No. PCT/FR97/01166, Jun. 3, 1997.

[30] Foreign Application Priority Data

Jul. 1, 1996 [FR] France ................................. 96 08183

[51] Int. Cl.[7] ........................................................ G01F 1/66
[52] U.S. Cl. .......................................................... 73/861.29
[58] Field of Search ........................... 73/861.29, 861.28, 73/861.27

[56] References Cited

U.S. PATENT DOCUMENTS 5,052,230  10/1991  Lang et al. ............................ 73/861.28
5,178,018   1/1993  Gill ....................................... 73/861.28

*Primary Examiner*—Eric S. McCall
*Assistant Examiner*—Jewel V. Thompson
*Attorney, Agent, or Firm*—Leonard W. Pojunas

[57] ABSTRACT

The invention relates to a method of measuring the flow rate of a flowing fluid on the basis of two ultrasonic signals transmitted consecutively in mutually opposite directions between two ultrasonic transducers. In the method, n clock signals $CK_i$, where i=1 to n, that are at mutual phase offsets of $2\pi/n$ are formed, the first clock signal, referenced CLS, that occurs immediately after a characteristic portion the first received ultrasonic signal $SIG_1$ appears is identified and stored, the time $t_1$ is determined that corresponds to the sum, over an integer number m of consecutive periods, of the times elapsed between the instant at which the characteristic portion of each of the m periods of the signal $SIG_1$ appears, and the instant at which the following signal CLS appears, likewise, for the signal $SIG_2$ received in the opposite direction, the time $t_2$ is determined that corresponds to the sum, over m consecutive periods, of the times elapsed between the instant at which the characteristic portion of each period appears and the instant at which the following signal CLS appears, the difference $|t_2-t_1|$ is taken, and the flow rate is deduced therefrom.

26 Claims, 12 Drawing Sheets

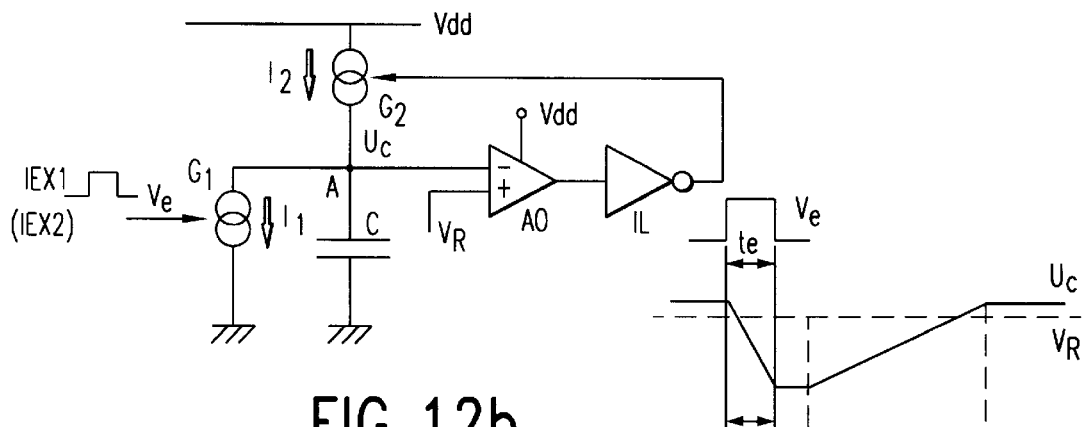
FIG. 12b
FIG. 12a
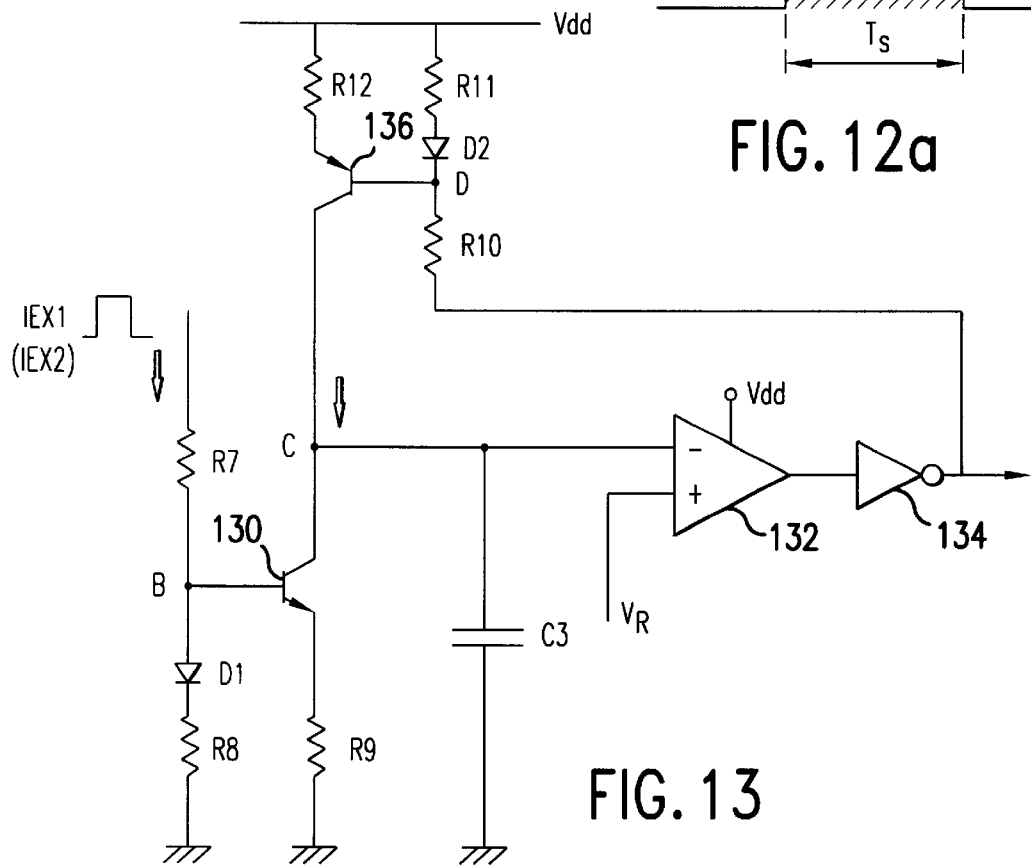
FIG. 13

METHOD AND APPARATUS FOR MEASURING THE FLOW RATE OF A FLOWING FLUID

This application is a continuation PCT/FR97/01166 filed Jun. 3, 1997.

The invention relates to a method of measuring the flow rate of a flowing fluid, the method consisting in causing two ultrasonic signals to propagate consecutively in opposite directions between two ultrasonic transducers spaced apart in the flow direction of the fluid, each transducer receiving a respective ultrasonic signal.

The invention also relates to apparatus for measuring the flow rate of a flowing fluid.

BACKGROUND OF THE INVENTION

It has been known for many years that the flow rate of a fluid, e.g. hot water flowing along a pipe, can be measured by measuring the respective propagation times of ultrasonic signals emitted upstream and downstream between two ultrasonic transducers situated at points spaced apart in the flow direction of the fluid.

In the field of measuring the flow rate of hot water, Document WO 86/02722 discloses a method consisting in causing both transducers to emit respective ultrasonic signals simultaneously, the two signals thus propagating in opposite directions.

Because of the presence of the flow, the propagation time T2 of the signal emitted upstream is longer than the propagation time T1 of the signal emitted downstream.

By measuring the two propagation times T1, T2, it is possible to deduce the hot water flow rate therefrom by using the formula Q=K(T2−T1)/C, where K is a term taking into account the geometry of the meter, and C is a correction term related to the speed of propagation of sound in water.

That method suffers from a major drawback. When one of the transducers has just been excited, it continues to emit a signal while it is receiving the signal coming from the other transducer. When the temperature of the water varies, drift has been observed, and additional unwanted phase shifts are observed in the received ultrasonic signals.

To overcome that problem, it is necessary to take temperature measurements and to correct the flow rate measurements as a function of fluctuations in temperature, which complicates the measurement method.

In addition, other measurement methods are known such as, for example, the method described in Document EP 0 426 309, in which method acoustic signals, each of which includes a phase inversion, are emitted consecutively in mutually opposite directions into a flowing fluid. The propagation time of each the received acoustic signals is measured by detecting the instant at which the phase inversion appears relative to a time reference which is related to the emission signal in question.

That instant is detected by means of an instantaneous phase detector, but such detection is not accurate.

For each of the acoustic signals, the time measurement is associated with a measurement of the acoustic phase shift induced in the acoustic signal in question because of the signal propagating in the flow.

The acoustic phase shift is measured by sampling the received signal on eight capacitors, by digitizing said sampled signal, and by performing synchronous detection on the resulting digitized signal.

Unfortunately, because of the sampling, that measurement method imparts additional noise to the sampled values of the signal, and thus to the measurement itself.

In addition, that method is complex because it requires the propagation time and the acoustic phase shift to be measured for each signal launch in a given propagation direction.

Therefore, it would be advantageous to find a measurement method that does not impart additional noise to the measurement, and that is simpler to implement than in the prior art.

OBJECTS AND SUMMARY OF THE INVENTION

The present invention thus provides a method of measuring the flow rate of a flowing fluid, the method consisting in causing two ultrasonic signals to propagate consecutively in opposite directions between two ultrasonic transducers spaced apart in the flow direction of the fluid, each transducer receiving a respective ultrasonic signal $SIG_1$, $SIG_2$, said method consisting in: forming $\underline{n}$ clock signals $CK_i$, where i=1 to n, and n≧4, which signals include transitions, are at mutual phase offsets of $2\pi/n$, are in a fixed relationship relative to an excitation signal for exciting the transducers, and are of the same frequency as said excitation signal; choosing a characteristic portion of a period of a first received signal $SIG_1$ received in one propagation direction; selecting the first transition of the clock signal that occurs immediately after said characteristic portion appears; storing the clock signal, referred to as "CLS"; determining the time $t_1$ corresponding to the sum, over an integer number m of consecutive periods, of the times elapsed between the instant at which the characteristic portion of each of the m periods of the signal $SIG_1$ appears, and the instant at which the first transition of the following signal CLS appears; identifying the same characteristic portion over m consecutive periods of a second received signal $SIG_2$ received in the opposite propagation direction; determining the time $t_2$ corresponding to the sum of the times elapsed between the instant at which the characteristic portion of each of the m periods of the signal $SIG_2$ appears and the instant at which the first transition of the following signal CLS appears; taking the difference $|t_2-t_1|$; and deducing therefrom the fluid flow rate Q which is proportional to $|t_2-t_1|$.

By creating $\underline{n}$ intermediate clock signals $CK_i$, it is possible to provide a time reference that is "variable", unlike the time references used in known methods of ultrasonically measuring the flow rate of a flowing fluid because, once the desired resolution is obtained for time measurement, another, more suitable, time reference is sought.

Because this time reference is created on the basis of clock signals, no additional noise is imparted, unlike with an analog-to-digital converter.

In addition, this method is simple because there is no sampling and no synchronous detection step, and it can thus be implemented with simple analog means, which is not the case with the prior art methods.

Furthermore, an electronic circuit with no analog-to-digital converter is more easy to integrate into an application specific integrated circuit (ASIC).

By using this "variable" time reference, it is possible to obtain the desired resolution more accurately and more rapidly.

With $\underline{n}$ signals $CK_i$ at phase offsets of $2\pi/n$, the resolution is T/n (T is the resolution obtained with the clock on the basis of which the $\underline{n}$ signals can be formed), and it is thus possible to measure the time lapse between the instant at which the characteristic portion of each of the m periods of said signal appears and the instant at which the first transition of the selected clock signal appears, with higher resolution than in the prior art.

Given that resolution increases when the number of measurements increases (the relationship is $1/\sqrt{N}$, where N is the number of measurements), it can be understood that the "variable" time reference makes it possible to increase the resolution directly, thereby requiring fewer measurements in order to achieve the desired resolution.

Advantageously, this method thus makes it possible to reduce the energy consumption required to obtain an ultrasonic measurement of the fluid flow rate with the same resolution as in the prior art methods.

In addition, it should be noted that, when acoustic wave emission frequencies of about 1 MHz are used, e.g. for a fluid such as water, the prior art methods such as the method described in Document EP 0 426 309 involve high energy costs, since it is necessary to provide an analog-to-digital converter that is capable of sampling a signal at 1 MHz and thus that is also high in cost, which is not the case with the invention.

The integer number m of periods may be equal to 1, or it may take other values. When m is different from 1, the period over which the characteristic portion is chosen may correspond to the first of the m consecutive periods, or else it may precede said m periods.

In the invention, the received signals $SIG_1$ and $SIG_2$ may be conditioned in the form of squarewave pulses, in which case the characteristic portions of the periods of the received signals correspond to the rising edge or the falling edge of each pulse.

In the invention, the clock signals may be in the form of squarewave pulses, in which case the first transition of the selected clock signal is a rising edge or a falling edge.

In the method of the invention, the respective differences $SIG_1$-CLS and $SIG_2$-CLS between the signals are computed so as to obtain the respective signals $IEX_1$ and $IEX_2$ which make it possible to determine the respective times $t_1$ and $t_2$.

The signals $IEX_1$ and $IEX_2$ may be in the form of squarewave pulses, and the method of the invention consists in expanding the cumulative duration of all of the pulses to determine the respective times $t_1$ and $t_2$.

For example, the clock signal $CK_1$ may be in phase with the excitation signal for exciting the transducers.

In a first implementation, four clock signals are formed.

In a second implementation, eight clock signals are formed.

Advantageously, on the basis of each received signal, a signal $SIG_S$ is formed that is phase offset relative to the clock signals, in order to prevent said signals from being simultaneous.

For example, the signal $SIG_S$ may be phase offset $\pi/n$.

The invention also provides apparatus for measuring the flow rate of a flowing fluid, said apparatus comprising:

at least two ultrasonic transducers spaced apart in the flow direction of the fluid;

means for forming an excitation signal for exciting the transducers; and means for receiving two ultrasonic signals $SIG_1$ and $SIG_2$ emitted consecutively by respective ones of said transducers in opposite directions;

said apparatus further comprising:

means for forming n clock signals $CK_i$, where i=1 to n, and n≧4, which signals include transitions, are mutually phase offset by $2\pi/n$, are in a fixed relationship relative to the excitation signal, and are of the same frequency as said excitation signal;

means for identifying a characteristic portion of a period of the first received signal $SIG_1$;

means for selecting the first transition of the clock signal $CK_i$ that occurs immediately after said characteristic portion appears;

means for storing the clock signal, referred to as "CLS";

means for determining the time $t_1$ corresponding to the sum, over an integer number m of consecutive periods, of the times elapsed between the instant at which the characteristic portion of each of the m periods of the signal $SIG_1$ appears, and the instant at which the first transition of the following signal CLS appears;

means for identifying the same characteristic portion over m consecutive periods of the second received signal $SIG_2$;

means for determining the time $t_2$ corresponding to the sum of the times elapsed between the instant at which the characteristic portion of each of the m periods of the signal $SIG_2$ appears and the instant at which the first transition of the following signal CLS appears; and means for taking the difference $|t_2-t_1|$ and for deducing therefrom the fluid flow rate Q which is proportional to $t_2-t_1$.

The apparatus may be implemented with simple analog means such as, in particular, D-type bistables or RS-type bistables, and it is therefore unnecessary to provide an analog-to-digital converter or to provide a plurality of capacitors for storing the sampled values.

The means for forming the clock signals $CK_i$ may comprise a crystal oscillator followed by n/2 D-type bistables forming a divider, and thus making it possible to obtain signals $CK_i$ that are mutually phase offset by $2\pi/n$.

The means for selecting the first transition of the clock signal may comprise n "selection" D-type bistables, the D input of each of the bistables being connected to the common received signal $SIG_1$ or $SIG_2$, the clock input CK of each of the bistables receiving a respective clock signal $CK_i$ that is different from one bistable to another, it being possible to activate the bistables via reset-to-zero inputs RAZ in a manner such that when the reset inputs RAZ of the bistables are at 1 and when the common signal is at 1, said bistables are sensitive to the signals $CK_i$.

The means for selecting the first transition of the clock signal may also comprise n logic gates, each of which receives the common received signal $SIG_1$ or $SIG_2$ via a respective input, and n monostable circuits, each of which receives a different clock signal $CK_i$, and has its output sent to a respective one of the other inputs of the n logic gates.

The means for storing the clock signal CLS may comprise firstly n storage D-type bistables, each of which receives, as a clock input CK, the Q output of a respective selection bistable, and, secondly a NAND logic gate having n inputs, each of which is connected to the $\overline{Q}$ output of a respective storage bistable, the D input of each of the storage bistables being permanently at 1, and the first signal received at the clock input CK of one of the bistables activating the storage function thereof by causing the Q output of said bistable to go to 1, and its $\overline{Q}$ output to go to 0, thereby activating a locking circuit for locking the common received signal $SIG_1$ or $SIG_2$.

In the apparatus of the invention, each one of n NAND logic gates receives a clock signal $CK_i$ and the Q output of the corresponding storage bistable via respective ones of its inputs, the output of each of the gates being connected to a respective one of the inputs of the NAND logic gate having n inputs, one of the n logic gates releasing the associated clock signal $CK_i$ when the storage function of the corresponding storage bistable is activated.

BRIEF DESCRIPTION OF THE DRAWINGS

Other characteristics and advantages appear from the following description given by way of non-limiting example and with reference to the accompanying drawings, in which:

FIG. 12a is a diagrammatic view showing the time expansion principle;

FIG. 12b is a simplified diagrammatic view of a time expander;

FIG. 13 is a diagrammatic view of a portion of the apparatus of the invention, comprising a time expander;

MORE DETAILED DESCRIPTION

Apparatus for measuring the flow rate of a flowing fluid, such as hot water, is shown in FIGS. 1, 2, 4, 7, and 11, and is designated by overall reference 10.

Figure 1:
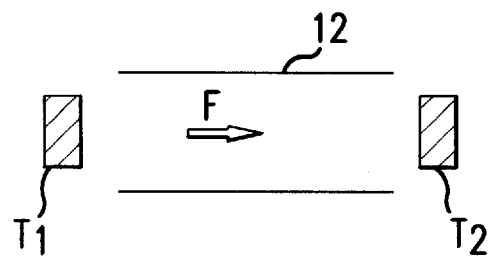
FIG. 1 shows how the ultrasonic transducers are disposed relative to the flow of fluid in a first embodiment.

As shown in part in FIG. 1, the apparatus of the invention includes two ultrasonic transducers $T_1$ and $T_2$ disposed in the flow and spaced apart in the flow direction of the fluid so as to collect information on the speed of the fluid.

In FIG. 1, the transducers $T_1$ and $T_2$ are placed facing each other at opposite ends of a measuring tube 12 along which the fluid flows in a direction indicated by arrow "F".

Figure 2:
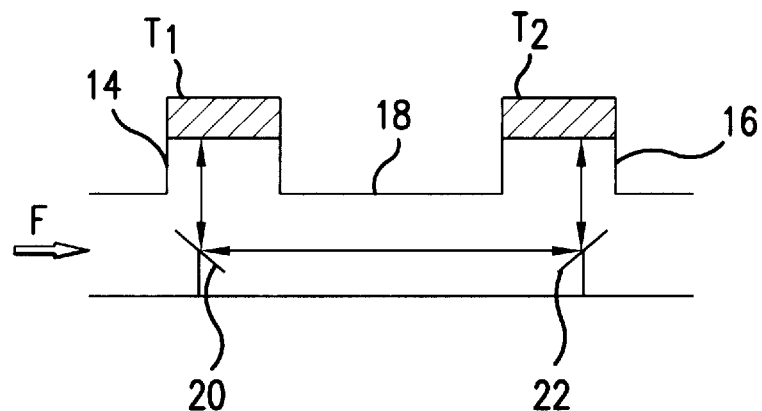
FIG. 2 shows another possibility for how the ultrasonic transducers may be disposed relative to the flow of fluid.

Another example of how the transducers $T_1$ and $T_2$ may be disposed is shown in FIG. 2, in which said transducers are placed at the backs of recesses 14 and 16 that are perpendicular to the fluid flow direction which is indicated by arrow "F".

The fluid flows through a measuring tube 18 in which two mirrors 20 and 22 are mounted serving to reflect the ultrasonic signals as indicated in FIG. 2.

Figure 3:
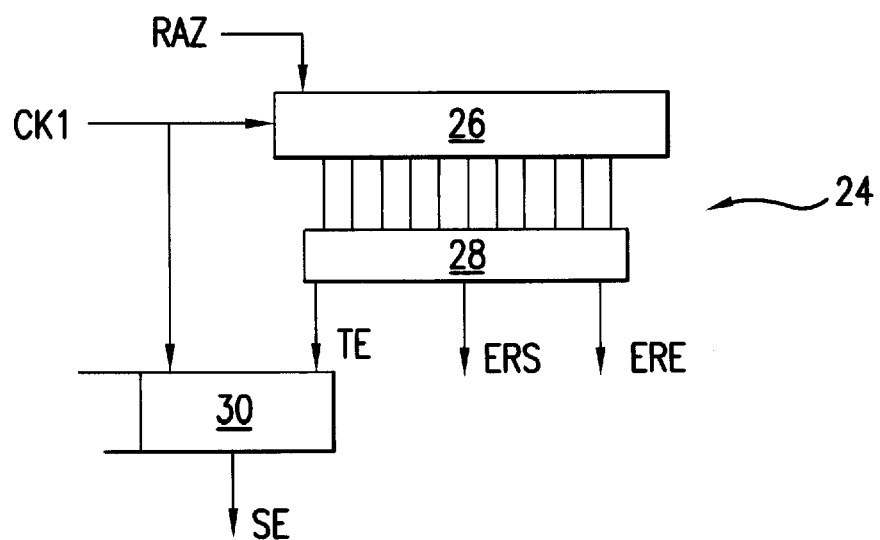
FIG. 3 is a simplified diagrammatic view of a sequencer used in the apparatus of the invention.

The ultrasonic transducers $T_1$ and $T_2$ are excited by an excitation signal coming from a sequencer 24 shown in simplified manner in FIG. 3. The sequencer comprises a 16-bit counter 26, a decoder 28 connected to the counter, and a unit 30 made up a plurality of logic gates.

A 1 MHz clock signal, $CK_1$, derived from a 4 MHz clock signal feeds the counter 26 and the unit 30 which also receives a signal THE coming from the decoder 28 and enabling an ultrasonic signal to be emitted. At its output, the unit 30 delivers an excitation signal SE which acts as a pilot signal. The counter 26 is activated when the reset-to-zero signal RAZ is delivered by a "standby" clock not shown in FIG. 3.

Figure 4:
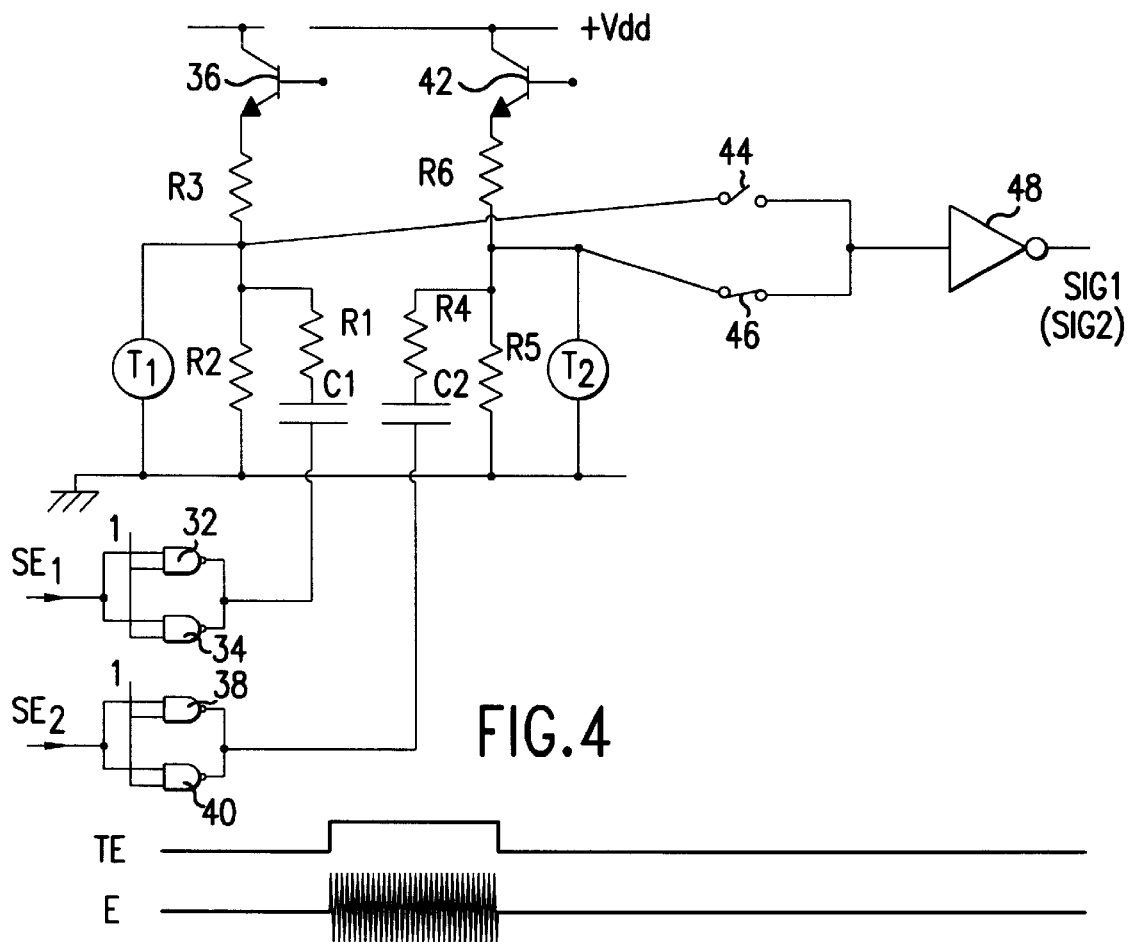
FIG. 4 is a diagrammatic view of a portion of the apparatus of the invention, comprising the units for emitting the ultrasonic signals, the unit for switching the transducers, and the unit for conditioning the received ultrasonic signals.

As shown in FIG. 4, the signal $SE_1$ serving to excite the transducer $T_1$ is sent to respective ones of the inputs of two NAND logic gates 32 and 34 connected in parallel so as to reduce the internal impedance of the circuit.

The other input of each of the NAND logic gates is connected to a logic signal of value 1. These gates may be replaced by inverters.

The outputs of the two logic gates 32 and 34 are connected to a capacitor $C_1$ connected in series with a resistor $R_1$, the resistor $R_1$ being connected to another resistor $R_2$ which is connected across the terminals of the transducer $T_1$.

The terminal of the transducer $T_1$ that is connected to the resistors $R_1$ and $R_2$ is also connected to a resistor $R_3$ receiving electric current coming from the collector of a switching transistor 36.

This PNP transistor 36 is fed with a voltage $V_{dd}$ at its emitter. By connecting the resistors $R_2$ and $R_3$ in series, it is possible to obtain a stable voltage for biasing the transducers, this bias voltage being equal to $V_{dd/2}$.

The capacitor $C_1$ isolates the voltage $V_{dd}$ from the input (where the signal SE is input) in order to prevent disturbing the potential of the divider circuit $R_2$ and $R_3$ when, in particular, the signal $SE_1$ is at its rest level. This also makes it possible to avoid excessive consumption.

The resistor $R_1$ isolates the transducer $T_1$ from the input signal in order to guarantee that the rectangular signal $\overline{SE1}$ is compatible with the highly capacitive transducer, and it makes it possible to control emission impedance better.

A symmetrical circuit is formed for the transducer $T_2$ which is excited by the signal $SE_2$, with NAND logic gates 38 and 40, resistors $R_4$, $R_5$, and $R_6$, a capacitor $C_2$, and a transistor 42.

Since the two branches of the symmetrical circuits are not connected together, good decoupling is thus guaranteed between the two transducers.

When the transducer $T_1$ emits an ultrasonic signal on being excited by an excitation signal of frequency equal to 1 MHz, the switch 44 of the switching unit is open, and the switch 46 connected to the transducer $T_2$ is closed.

For example, the ultrasonic signal as emitted and represented by the letter E in FIG. 5 may have a duration equal to 40 μs.

Figure 5B:
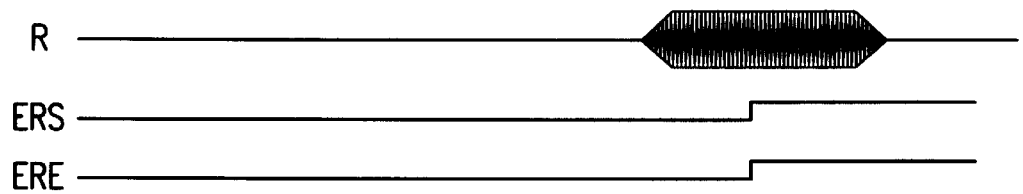
FIG. 5b shows the steps of emitting and of receiving the ultrasonic signals.

About 80 ms after the instant at which signal emission starts, the ultrasonic signal is received by the transducer $T_2$ (FIG. 5b).

Figure 5A:
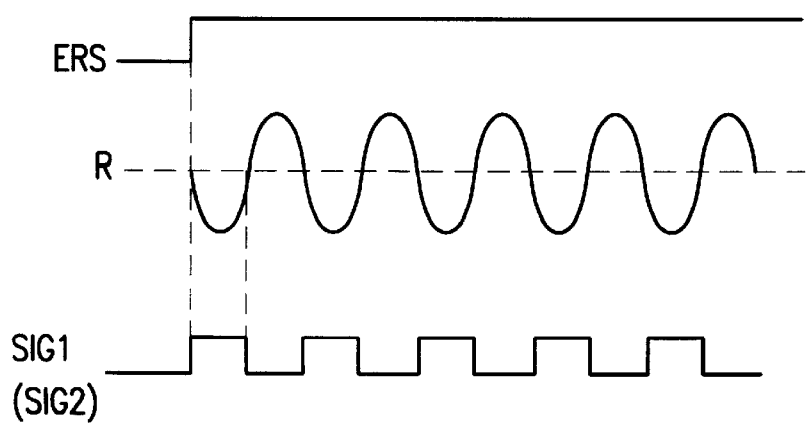
FIG. 5a shows the signal $SIG_1$ ($SIG_2$) formed on the basis of the received ultrasonic signal.

The received signal, represented by the letter R in FIGS. 5a and 5b is conditioned in an inverter 48 (FIG. 4), e.g. a CMOS inverter of the HCO4 type containing 3 inverters in cascade delivering a squarewave signal $SIG_1$ as shown in FIG. 5a.

By way of variant, the conditioning may be performed with a differential comparator having one input receiving the signal coming from the switching unit and its other input receiving a reference signal coming from a specialized divider or from an RC network defining the mean value of the signal.

Figure 6:
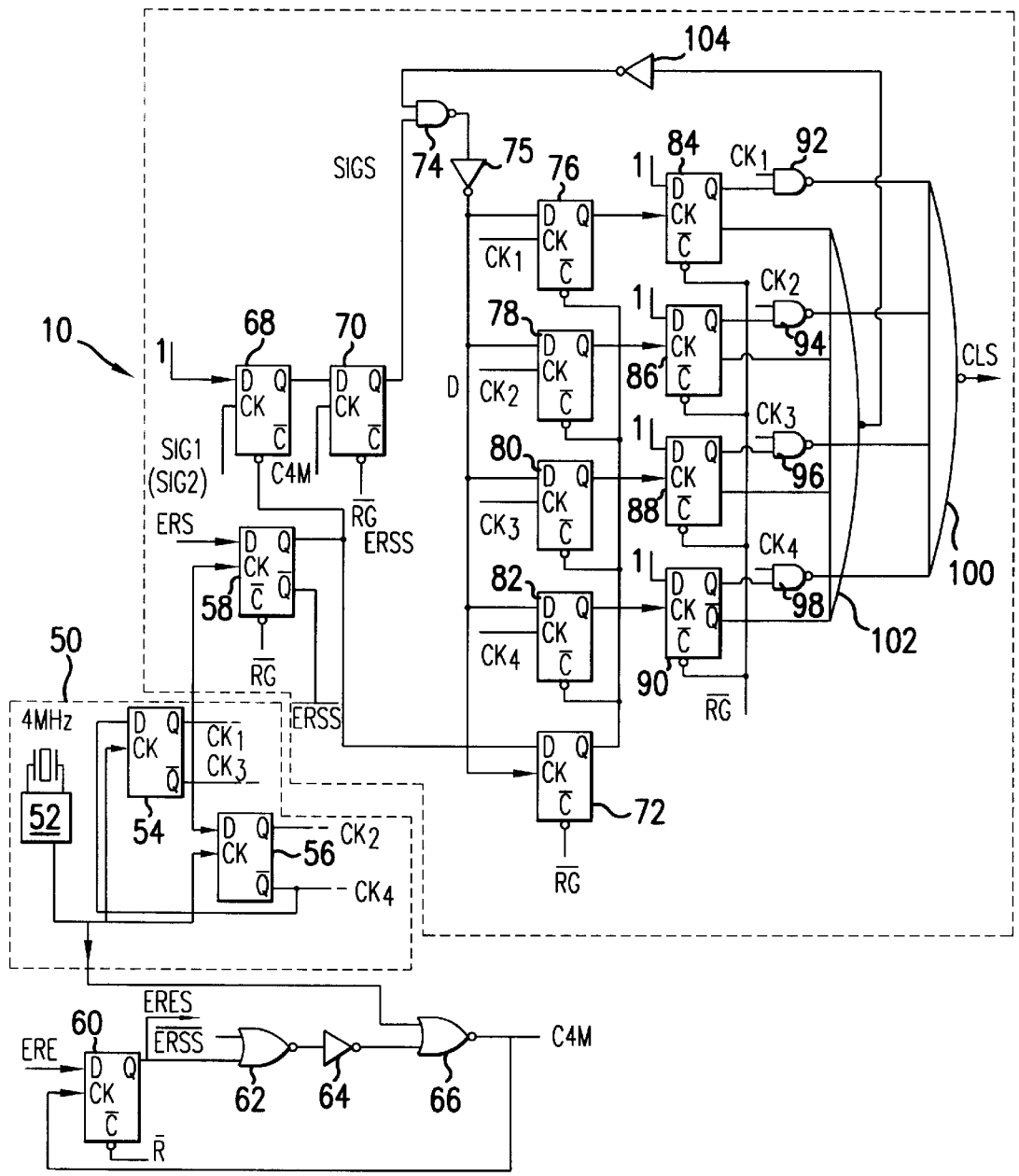
FIG. 6 is a diagrammatic view of a portion of the apparatus of the invention, comprising the unit for forming the clock signals $CK_i$ (i=1 to 4) and the units for selecting and storing the clock signal CLS.

As shown in FIG. 6, the apparatus 10 comprises means 50 for forming four clock signals $CK_i$, where i=1 to 4.

These means include a crystal oscillator 52 of frequency equal to 4 MHz. The oscillator delivers a clock signal which is applied to the clock inputs CK of two D-type bistables 54 and 56 which form a divider. The waveform of the clock signal of frequency equal to 4 MHz is shown in FIG. 7.

The $\overline{Q}$ output of the bistable 56 is connected to the D input of the bistable 54, and the Q output of the bistable 54 is connected to the D input of the bistable 56.

Figure 7:
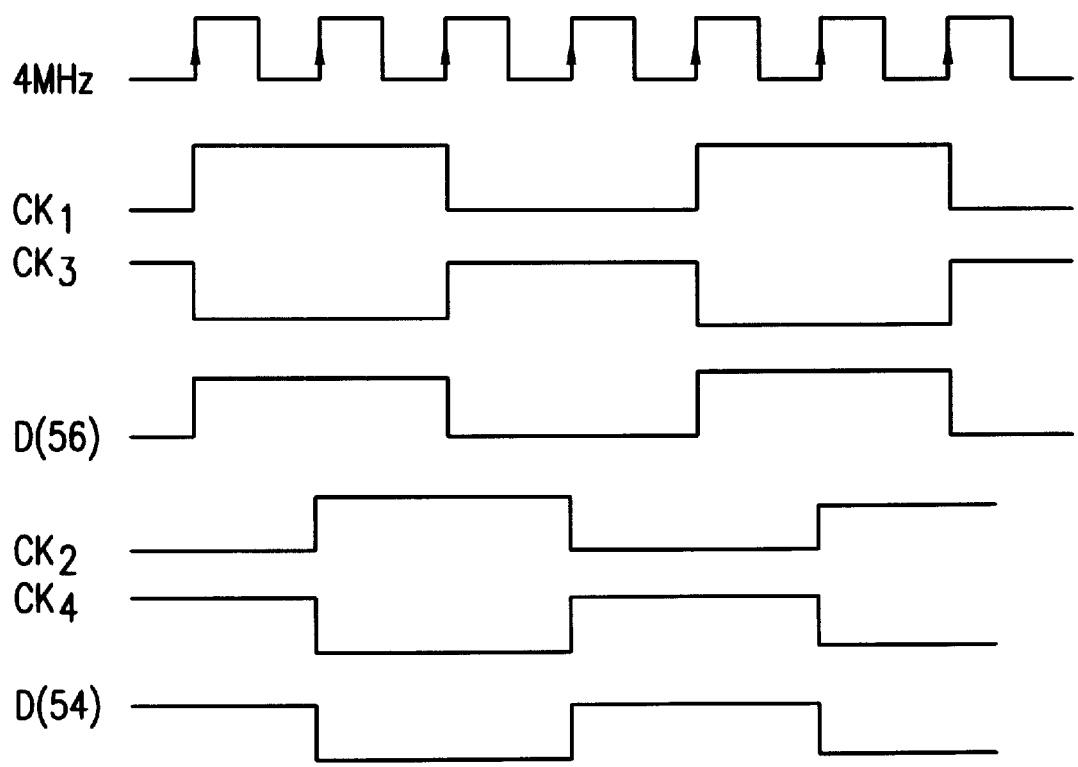
FIG. 7 shows the waveforms of the four clock signals $CK_i$ relative to one another.

As shown in FIG. 7, assuming that the signal $CK_2$ is at 0, and the signal $CK_4$ is at 1, when a rising edge of the clock signal at 4 MHz arrives, the clock signal $CK_1$ delivered by the Q output of the bistable 54 goes to 1, and the D input of the bistable 56 thus also takes the value 1.

The clock signal $CK_3$ delivered by the $\overline{Q}$ output of the bistable 54 thus goes to 0.

On the following rising edge of the clock signal at 4 MHz, the clock signal $CK_2$ delivered by the Q output of the bistable 56 goes to 1.

Thus, the clock signal $CK_4$ delivered by the $\overline{Q}$ output of the bistable 56 goes to 0, and the D input of the bistable 54 thus also takes the value 0.

On the next rising edge of the clock signal at 4 MHz, the clock signal $CK_1$ returns to 0, while the signal $CK_3$ goes to 1, and so the D input of the bistable 56 also goes to 0.

When the following rising edge of the clock signal at 4 MHz arrives, the clock signal $CK_2$ delivered by the Q output of the bistable 56 goes to 0, and the signal $CK_4$ thus goes to 1, thereby causing the D input of the bistable 54 to go to 1. On another rising edge of the clock signal at 4 MHz, the clock signal $CK_1$ goes to 1, the clock signal $CK_3$ thus goes to 0, and the D input of the bistable 56 goes to 1. A following rising edge of the clock signal at 4 MHz causes the clock signal $CK_2$ to go to 1, and thus causes the clock signal $CK_4$ and the D input of the bistable 54 to go to 0.

The four resulting clock signals $CK_1$, $CK_2$, $CK_3$, and $CK_4$ are shown in bold in FIG. 7.

These signals have the same frequency (1 MHz) as the excitation signals $SE_1$ and $SE_2$ for exciting the transducers, which excitation signals are created on the basis of the clock signal $CK_1$. The clock signals are offset in phase relative to one another by π/2, and they are in a fixed phase relationship relative to the excitation signals for exciting the transducers.

In addition, the signals have transitions between a logic value 0 and a logic value 1.

A variant of the circuit 50 consists in forming a clock signal $CK_1$ at 1 MHz on the basis of a clock signal at 2 MHz generated by an oscillator, and by means of a D-type bistable.

The signal $CK_2$ is then formed on the basis of the signal $CK_1$ by creating an artificial delay, e.g. by means of a monostable circuit (or time-delay circuit), and the signals $CK_3$ and $CK_4$ are obtained easily on the basis of the signals $CK_1$ and $CK_2$ by inverting them.

As shown in FIG. 3, a "synchronization" signal ERS is generated by the decoder 28 of the sequencer 26, and its waveform is shown in FIGS. 5 and 5a.

Its logic value is at 0, and, after a lapse of time equal to 95 ms, its value goes to 1 when the received signal is situated in its central portion which is less disturbed than the beginning or the end of said received signal. This signal triggers the beginning of the stage in which a clock signal $CK_i$ is selected.

With reference to FIG. 6, the signal ERS is sent to the D input of a D-type bistable 58. This bistable is capable of generating at its Q output a signal ERSS which corresponds to the signal ERS synchronized with the clock signal $CK_1$ which is sent to the clock input CK of the bistable 58.

The signal $CK_1$ has been chosen arbitrarily.

A signal ERE is generated by the decoder 28 of the sequencer 26 (FIG. 3), and its waveform is shown in FIG. 5b.

Its logic value is at 0 and, 2 ms after the signal ERS goes to 1, its value goes to 1. This signal triggers the beginning of the measurement stage.

With reference to FIG. 6, the signal ERE is sent to the D input of a D-type bistable 60 whose reset-to-zero $\overline{C}$ (clear) input is connected to a signal R which reinitializes it at the beginning of a measurement.

The Q output of the bistable 60 is connected to one of the inputs of a logic gate 62 of the NOR type, the other input receiving the signal $\overline{ERSS}$.

The output of this gate 62 is connected to an inverter 64 whose output is connected to one of the inputs of a logic gate 66 of the NOR type, the other input receiving the clock signal at 4 MHz.

A signal C4M of frequency equal to 4 MHz is delivered at the output of this gate 66. The signal C4M is reinjected into the clock input CK of the bistable 60. The signal C4M is triggered by the signal $\overline{ERSS}$ going to zero, and it is inhibited when the signal ERE synchronized by the signal C4M appears.

Figure 8C:
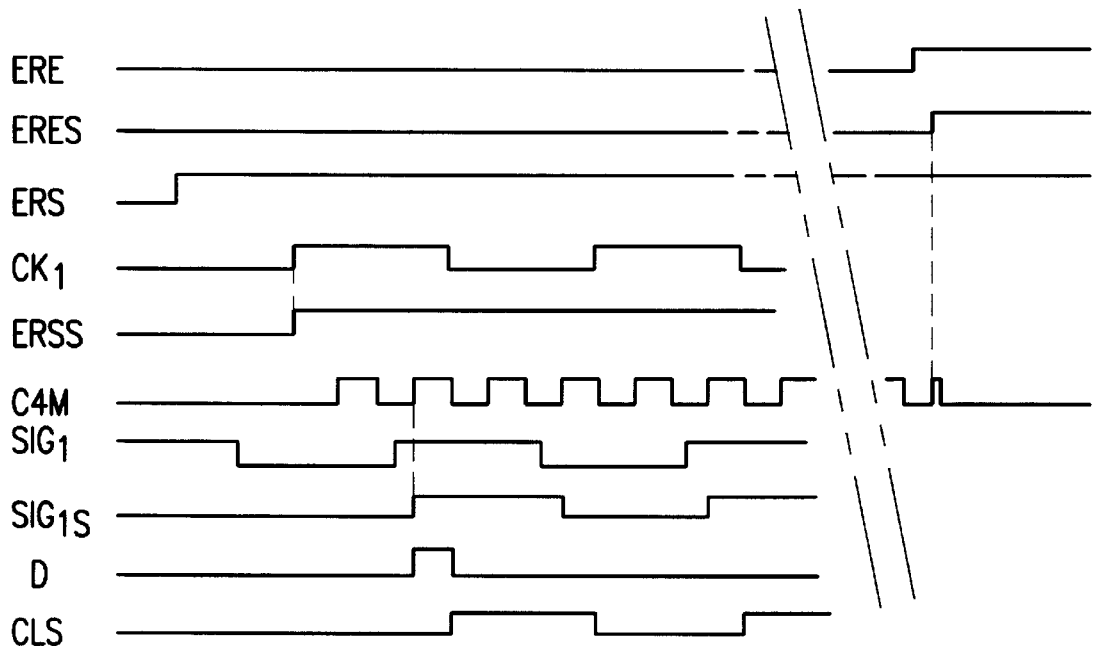
FIG. 8c shows the waveforms of the main signals used as a function of time.

It should be noted that this logic circuit limits the presence of the signal C4M, in particular at the inputs CK of the bistables 60 and 70, thereby minimizing the energy consumption of the circuit (FIG. 8c).

The Q output of the bistable 60 delivers a signal ERES which corresponds to the signal ERE synchronized with the signal C4M and whose waveform is shown in FIG. 8c. This signal serves to enable the measurement unit which is described below.

The synchronized signal ERSS is sent to the $\overline{C}$ input of a D-type bistable 68. The signal SIG ($SIG_1$ or $SIG_2$) is sent to the clock input CK of this bistable whose D input is at 1.

The Q output of the bistable 68 is connected to the D input of a D-type bistable 70.

The signal C4M is sent to the clock input CK of the bistable 70, and the $\overline{C}$ input is connected to a signal $\overline{RG}$ whose purpose is to initialize the bistable at the beginning of a full measurement cycle which is constituted by emitting an ultrasonic signal in the flow direction of the fluid, referred to as a "downstream launch", and by emitting a signal in the opposite direction, referred to as an "upstream launch".

When the signal ERSS at the Q output of the bistable 58 goes to 1, the first rising edge of the conditioned signal $SIG_1$ (or $SIG_2$) causes the Q output of the bistable 68 to go to 1, thereby allowing the Q output of the bistable 70 to go to 1 on the first rising edge of the signal C4M.

The resulting signal $SIG_{1S}$ corresponds to the signal $SIG_1$ synchronized with the signal C4M.

To obtain the signal $SIG_{1S}$ that is phase shifted relative to the signal $SIG_1$, it is possible to replace the bistable 70 with four logic inverters in series disposed at the Q output of the bistable 68.

The signal ERSS is also sent to the D input of a D-type bistable.

The $\overline{C}$ input of the bistable 72 receives the above-mentioned signal $\overline{RG}$.

The clock signal CK of the bistable 72 is connected to the signal $SIG_{1S}$.

The common signal $SIG_{1S}$ is also sent to one of the inputs of a logic gate 74 of he NAND type and whose output is directed to an inverter 75 which sends the signal $SIG_{1S}$ to the D inputs of four D-type bistables 76, 78, 80, 82.

The $\overline{C}$ input of each bistable is connected to the Q output of the bistable 72.

When the signal ERSS is at 1, the first rising edge of the signal $SIG_{1S}$ triggers the bistable 72 and causes its Q output to go to 1.

The first rising edge of $SIG_{1S}$ that appears after ERSS has gone to 1 releases the $\overline{C}$ inputs of the four bistables 76, 78, 80, and 82.

Four other D-type bistables 84, 86, 88, 90 receive respective ones of the Q outputs of the bistables 76, 78, 80, 82 at their clock inputs CK.

The D inputs of the bistables 84, 86, 88, 90 are set to 1 permanently, and their C inputs are connected to the common initialization signal $\overline{RG}$.

The $\overline{Q}$ outputs of the bistables 84 to 90 are connected to respective ones of four logic gates 92, 94, 96, and 98 of the NAND type, the other inputs of these gates receiving respective ones of the clock signals $CK_1$, $CK_2$, $CK_3$, and $CK_4$. The outputs of the logic gates 92 to 98 are connected to respective ones of four inputs of a logic gate 100 of the NAND type.

The $\overline{Q}$ outputs of the bistables 84 to 90 are connected to respective ones of four inputs of a logic gate 102 of the NAND type whose output is inverted by a logic inverter 104 and is then reinjected into the second input of the logic gate 74.

Whenever a rising edge of the signal $SIG_{1S}$ is identified (such an edge may be deemed to constitute a characteristic portion of the signal) by the four bistables 76, 78, 80, 82, they are activated, and they receive respective ones of the clock signals $CK_1$, $CK_2$, $CK_3$, $CK_4$ at their clock inputs CK.

The common signal $\overline{RG}$ is at 1 (initialization at the beginning of the measurement), the bistables 84 to 90 are rendered active, and they are thus sensitive to the Q outputs of the bistables 76, 78, 80, 82.

The first transition or rising edge of the first clock signal that arrives immediately after the rising edge of the signal $SIG_{1S}$ appears triggers the Q output of the bistable receiving the clock signal in question.

The bistables 76, 78, 80, 82 make it possible to identify the rising edge of $SIG_{1S}$ and to select the first transition of the clock signal $CK_i$ that occurs immediately after the rising edge appears. For example, if $CK_3$ is the selected clock signal because it is closest in time to $SIG_{1S}$, then this signal being selected by the bistable 80 causes the Q output of the bistable to go to 1, thereby also causing the Q output of the corresponding bistable 88 to go to 1.

The Q outputs of the other bistables 76, 78, and 82 are always at 0.

The Q output of the bistable 88 is then at 0 and thus causes the output of the logic gate 102 to go to 1. The inverted signal arriving at the second input of the logic gate 74 is then at 0, which locks the gate and causes the common signal output by the gate and interconnecting the D inputs of the bistables 76 to 82 to go to 0.

In this way, the bistables 76 to 82 become insensitive to the clock signals $CK_i$, and the Q outputs of the bistables remain at 0.

This makes it possible to prevent other clock signals from being selected, and, in this way, the selected clock signal $CK_3$ is stored.

Since the Q output of the bistable 88 is at 1, the signal $CK_3$ is released by the logic gate 96 and is applied to one of the four inputs of the logic gate 100. The other inputs of this gate 100 are at 1, because of the 0 state of the Q outputs of the bistables 84, 86, and 90, and therefore the gate 100 delivers the signal $CK_3$ which is referred to below as "CLS". The signal CLS corresponds to the clock signal selected by the above-described circuit.

Since the signal $SIG_1$ is synchronized by the signal C4M, it is possible to prevent the edges of the signals $SIG_1$ and CLS from appearing simultaneously.

Figure 8A:
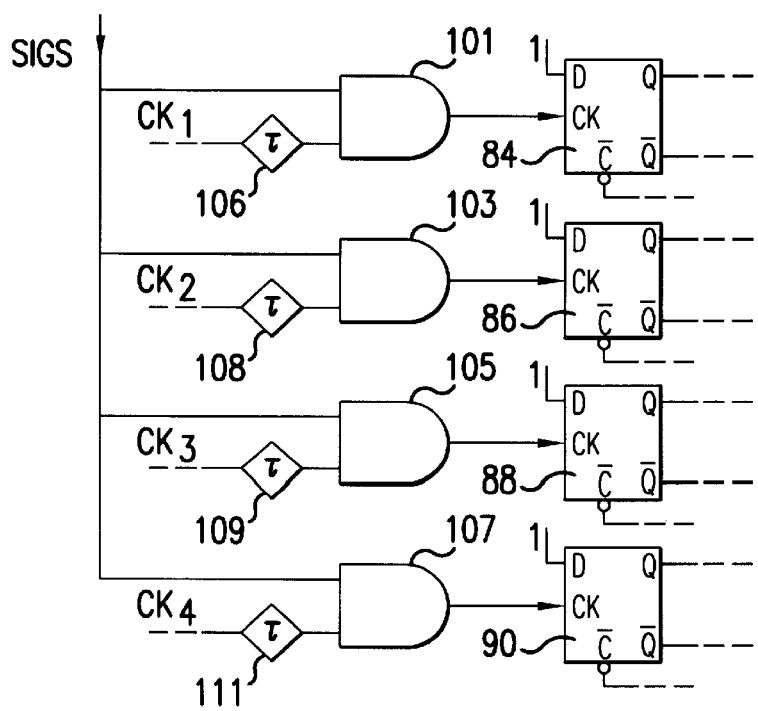
FIG. 8a is a variant of the portion of the apparatus shown in FIG. 6 that selects the clock signal CLS.

By way of a variant shown in FIG. 8*a*, the functions of identifying the rising edge of a period of the signal $SIG_{1S}$ and of selecting the first transition (rising edge) of the clock signal $CK_i$ that occurs immediately after the rising edge of the period of the signal $SIG_{1S}$ appears may also be performed as follows: the common signal $SIG_{1S}$ is sent to one of the inputs of each of four AND logic gates 101, 103, 105, 107, and each of the signals $CK_i$ is applied to the input of a respective monostable circuit 106, 108, 109, 111 whose output is connected to the other one of the inputs of a respective one of the above-mentioned four AND logic gates 101, 103, 105, 107. The outputs of the four AND logic gates are sent to the clock inputs CK of respective ones of the four storage bistables 84, 86, 88, and 90.

Figure 8B:
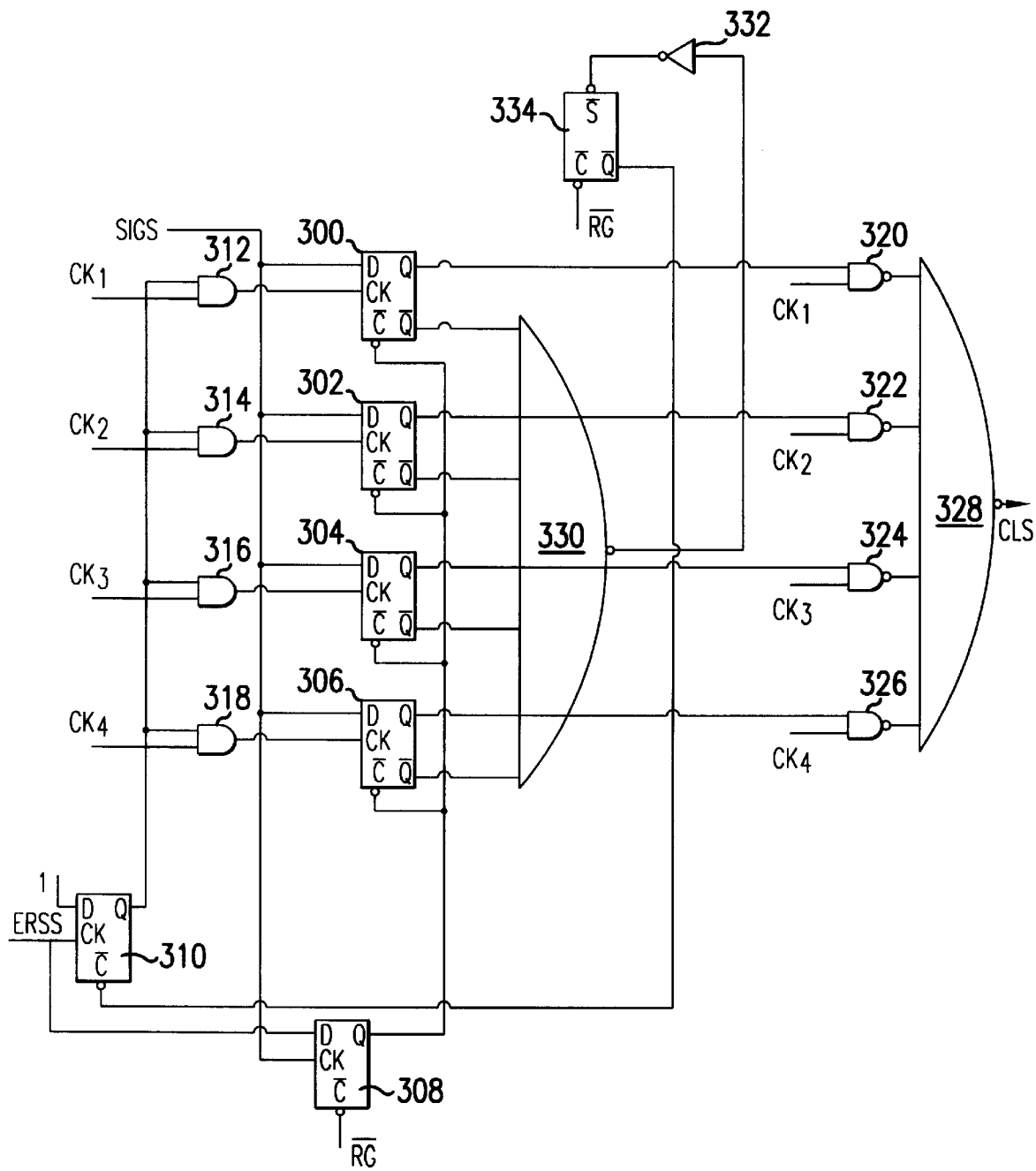
FIG. 8b is a variant of the portion of the apparatus shown in FIG. 6 that shows the units for selecting and storing the clock signal CLS.

FIG. 8*b* shows a variant embodiment of the apparatus shown in FIG. 6. In this variant, one D-type bistable stage 84–90 has been omitted. FIG. 8*b* shows only those elements which are different from the elements shown in FIG. 6.

The common signal $SlG_{1S}$ or $SIG_{2S}$ coming from the Q output of the bistable 70 is sent to the D inputs of four D-type bistables 300, 302, 304, and 306, and to the clock input CK of another D-type bistable 308 whose Q output is connected to the $\overline{C}$ inputs of said bistables 300–306.

A D-type bistable 310 receives the signal ERSS at its clock input, its D input is at 1 permanently, and its Q output is sent to a respective one of the two inputs of each of four AND logic gates 312, 314, 316, 318, the other input of each of these gates receiving a respective one of the clock signals $CK_1$, $CK_2$, $CK_3$, $CK_4$.

Thus, when the signal ERSS goes to 1, the Q output of the bistable 310 goes to 1, thereby releasing the clock signals $CK_i$. One half period of the signal C4M later, the rising edge of the signal $SIG_{1S}$ arrives at the D inputs of the bistables 300–306, and, at the same time, activates the $\overline{C}$ inputs of these bistables via the bistable 308.

The first rising edge of the clock signal $CK_i$, e.g. $CK_3$, that immediately follows the rising edge of the signal $SIG_{1S}$ activates the corresponding D-type bistable 304 whose Q output goes to 1.

Since each of the Q outputs of the bistable D 300–306 is sent to the input of a respective NAND logic gate 320, 322, 324, 326, and since the other input of each gate receives a respective different signal $CK_i$, where i=1 to 4, the Q output of the bistable 304 going to 1 releases the signal $CK_3$ from the logic gate 324 which signal is applied to a respective one of the four inputs of a NAND logic gate 328.

The other three inputs of the gate 328 are connected to the outputs of the gates 320, 322, and 326 so that the signal $CK_3$ released by the gate 324 is located at the output of the gate 328

The $\overline{Q}$ outputs of the bistables 300–306 are connected to respective ones of the four inputs of a NAND logic gate 330 whose output is sent to a logic inverter 332 which is connected to the $\overline{S}$ (set) input of an RS-type bistable 334.

The Q output of the bistable 334 is applied to the $\overline{C}$ input of the bistable 310 and the $\overline{C}$ input of said bistable 334 receives the reinitialization signal $\overline{RG}$ which is produced every two measurements (after an upstream launch and a downstream launch).

Thus, since the Q output of the bistable 304 goes to 1, the $\overline{Q}$ output goes to 0, the output of the gate 330 goes to 1, and the $\overline{S}$ input of the bistable 334 is thus at 0, thereby forcing the Q output of said bistable 334 to 1, and forcing its $\overline{Q}$ output to 0.

As a result, the $\overline{C}$ input of the bistable 310 goes to 0, and the Q output goes to 0, thereby locking the logic gates 312–318. The RS bistable 334 thus locks the clock signal selection, and the clock signal $CK_3$ (CLS) selected by the bistable 304 is thus stored in said bistable 304.

This variant makes it possible to reduce the energy consumption of the apparatus because the signals $CK_i$ are not sent directly to the clock inputs CK of the bistables 300–306.

Figure 9:
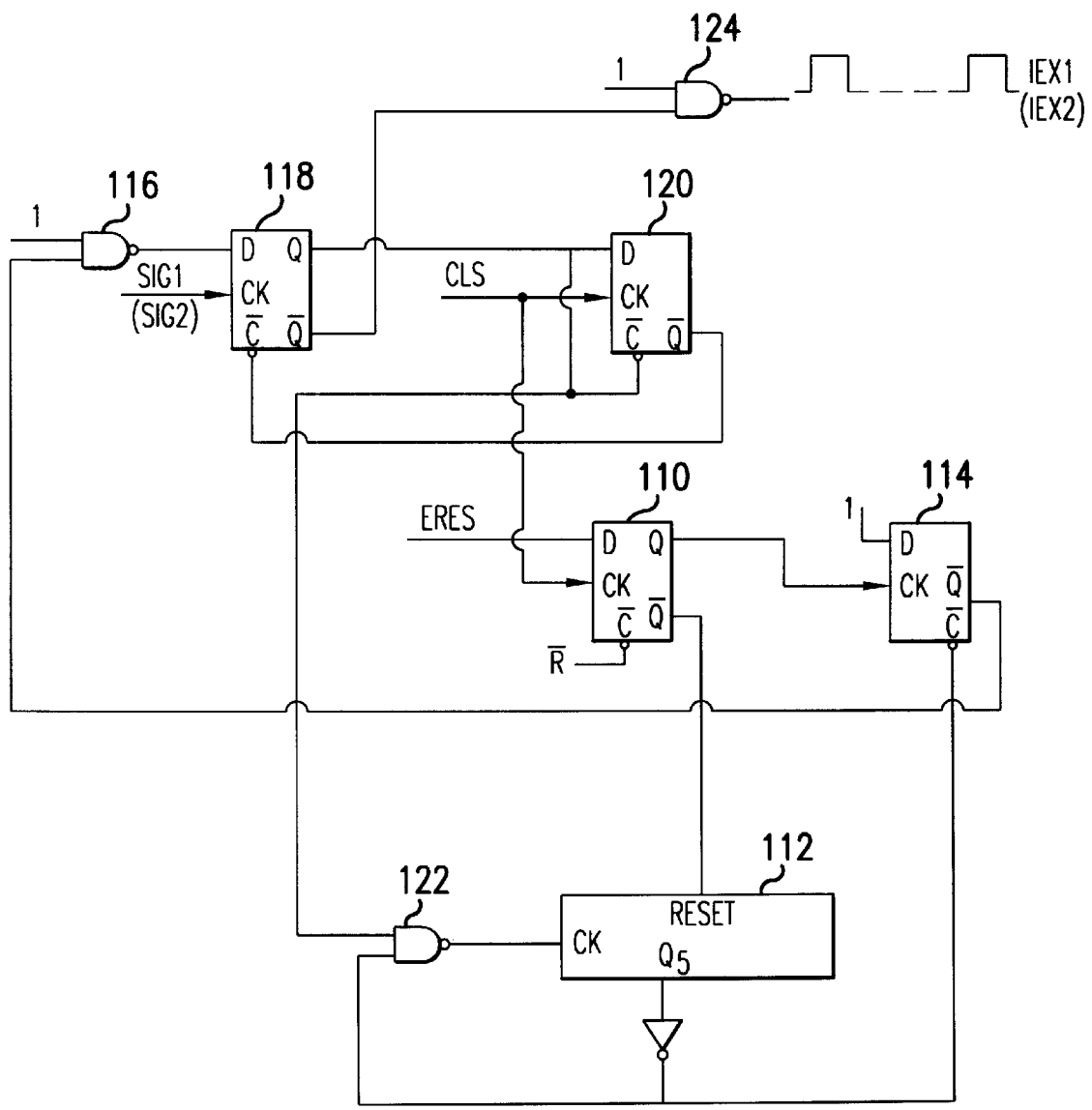
FIG. 9 is a diagrammatic view of a portion of the apparatus of the invention, comprising the unit for generating the signals $IEX_1$ and $IEX_2$ ($SIG_1$-CLS and $SIG_2$-CLS), as simplified.
Figure 10:
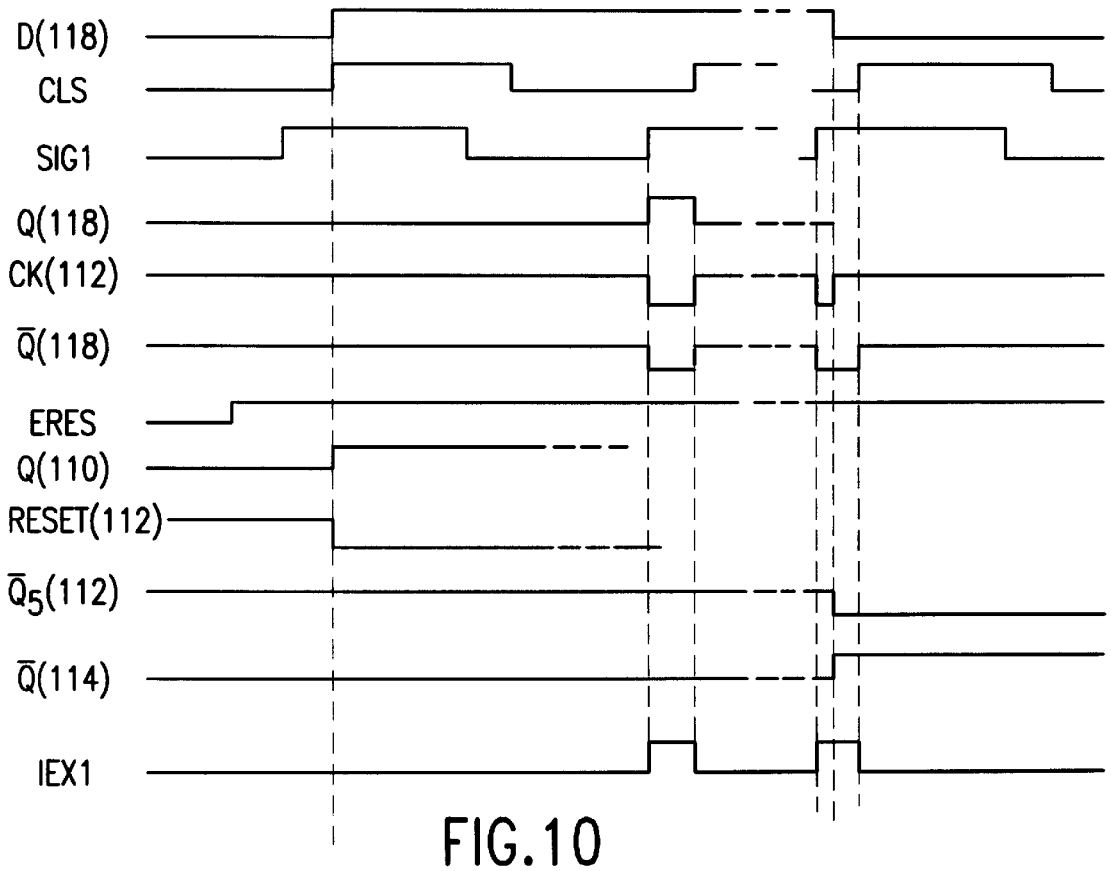
FIG. 10 is a diagram showing the step of generating the signals $IEX_1$ and $IEX_2$.

The following description given with reference to FIGS. 9 and 10 explains generating the signal $SIG_1$-CLS, referenced $IEX_1$, that is formed on the basis of an integer number m of consecutive periods of the signal $SIG_1$.

The signal $IEX_1$ is in the form of m squarewave pulses in which the width of each pulse corresponds to the time elapsed between the instant at which the characteristic portion of a period of the signal $SIG_1$, e.g. its rising edge, appears and the instant at which the first transition of the following signal CLS, e.g. the rising edge of this signal (FIG. 10) appears.

For example, the number m may be equal to 16, so as to reduce the noise accompanying the measurements, and for performing an averaging function.

When the Q output of the bistable 60 (FIG. 6) goes to 1, the signal ERES enables a D-type bistable 110 (FIG. 9) to make the selected clock signal CLS active at the clock input CK of said bistable 110.

The $\overline{C}$ input of the bistable 110 is connected to the reset signal $\overline{R}$ which is activated at the beginning of each measurement.

On a rising edge of the signal CLS (FIG. 10), the Q output of the bistable 110 goes to 1, thereby forcing the $\overline{Q}$ output of said bistable to 0, and thus releases the inhibition on the reset input of a 16-bit counter, 112, e.g. of the HC4040 type which starts counting the 16 pulses. The Q5 output of the counter 112 goes to 1 at the beginning of the sixteenth pulse and the inverse of this signal is sent to the $\overline{C}$ input of a D-type bistable 114.

The Q output of the bistable 110 is connected to the clock input CK of the bistable 114 whose D input is at 1 permanently, and the Q output of the bistable 110 going to 1 forces the $\overline{Q}$ output of the bistable 114 to 0.

The $\overline{Q}$ output of the bistable 114 is sent to an input of a NAND logic gate 116 whose other input is at 1 permanently, and whose output is connected to the D input of a D-type bistable 118.

Since the $\overline{Q}$ output of the bistable 114 goes to 0, the D input of the bistable 118 goes to 1 (FIG. 10).

The first rising edge of the signal $SIG_1$ which arrives at the clock input CK of the bistable 118 after the D input has gone to 1 causes the Q output of the bistable to go to 1 (FIG. 10).

The Q output of the bistable 118 is connected firstly to the D input of a bistable 120 and secondly to the $\overline{C}$ input of this bistable and to one of the inputs of a NAND logic gate 122 whose output is applied to the clock input CK of the counter 112. The $\overline{Q}$ output of the bistable 120 is connected to the $\overline{C}$ input of the bistable 118. When the Q output of the bistable 118 is at 0, the gate 122 receives a logic signal of value 0 at one of its inputs, and the output of this gate is thus at 1.

As soon as the Q output of the bistable 118 goes to 1, the output of the gate 122 goes to 0, and the resulting falling edge triggers counting of the first pulse by the counter 112.

Simultaneously, the $\overline{Q}$ output of the bistable 118 which was at 1 goes to 0, and thus forces the output of a logic gate 124 to 1.

As soon as the rising edge of the selected clock signal CLS arrives at the clock input CK of the bistable 120 (FIG. 10), the $\overline{Q}$ output of this bistable goes to 0, thereby forcing the Q output of the bistable 118 to 0.

As a result, the signal coming from the $\overline{Q}$ output of the bistable 118 goes to 1 and the first pulse of the signal $IEX_1$ is formed (FIG. 10).

Sixteen consecutive pulses are thus formed in analogous manner.

The sixteenth consecutive rising edge of the signal $SIG_1$ appearing causes, in the same way, the signal at the output of the logic gate 122 to go to 0, thereby activating counting of the last pulse by the counter 112.

The signal output from the $\overline{Q}$ output of the bistable 118 thus also goes to 0. The sixteenth falling edge appearing at the clock input of the counter 112 causes the Q5 output of this counter to go to 1, and thus the inverted output to go to 0, thereby locking the NAND gate 122.

As a result, the signal at the output of the logic gate 122 goes back to 1 (FIG. 10), thereby stopping the counting. The $\overline{C}$ input of the bistable 114 goes to 0, thereby forcing the $\overline{Q}$ output of the bistable 114 to 1 and thus the D input of the bistable 118 to 0, thereby blocking this bistable.

When the following rising edge of the selected clock signal CLS appears at the clock input CK of the bistable 120, the $\overline{Q}$ output thereof goes to 0 which forces the $\overline{Q}$ output of the bistable 118 to 1, and the sixteenth pulse of the signal $IEX_1$ is formed (FIG. 10).

The following step consists in determining the time $t_1$ which corresponds to the sum, over these sixteen pulses, of the times elapsed, over each period of the signal $SIG_1$, between the instant at which the rising edge of said signal appears and the instant at which the first rising edge of the signal CLS which arrives immediately afterwards appears.

Figure 11:
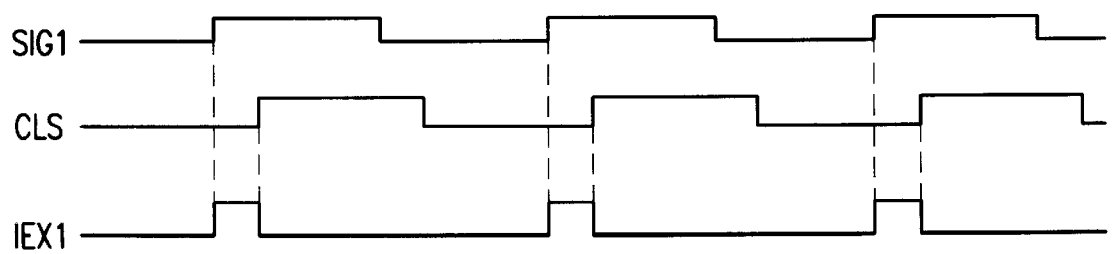
FIG. 11 shows the waveforms of the signals $SIG_1$, CLS, and $IEX_1$.

This step consists in determining the sum of the widths of the sixteen pulses formed (FIG. 11), only three of the pulses being shown in FIG. 11.

FIG. 12b is a simplified diagrammatic view of a time expander. A time expander is useful because of the narrow widths of the pulses of the signal $IEX_1$, it being impossible for such widths to be determined by conventional means such as, for example, pulse-counting means which would require a clock and a counter of very high frequency.

The width of each of the pulses of the signal $IEX_1$ obtained with four clock signals may, for example, represent a unit time approximately in the range 130 ns to 375 ns.

As shown in FIG. 12b, the signal $IEX_1$, represented by a voltage $V_e$ that can take the logic values 0 and 1, is sent to a current generator $G_1$ delivering a current $I_1$. This generator is connected via one of its terminals to the point A. A capacitor C, e.g. having capacitance of 22 nF, is connected via one of its plates to the point A, and the voltage $U_c$ across the terminals of the capacitor is applied to the inverting input of an operational amplifier AO used as a comparator.

The non-inverting input of this comparator AO receives a reference voltage $V_R$ (e.g. +1.5 V).

The comparator is fed with a voltage $V_{dd}$ (e.g. 3.3 V).

The output of the comparator AO is connected to a trigger logic inverter IL whose output is sent to a second current generator $G_2$ which delivers a current $I_2$. The second generator is fed with a voltage $V_{dd}$ and is connected via one of its terminals to point A.

When the voltage $V_e$ is 0 (FIG. 12a), the current $I_1$ is zero, the voltage $U_c$ across the terminals of the capacitor remains greater than the reference voltage $V_R$, the output VAO of the comparator is zero, the output of the inverter IL is 1, and the current $I_2$ is zero.

When the voltage $V_e$ is 1 (FIG. 12a), the current $I_1$ is equal, for example, to 3 mA, and the capacitor C discharges to a certain value $U_c$ lower than $V_R$, at which value the voltage $V_e$ becomes zero again.

The output voltage VAO then goes to its maximum value (e.g. equal to 2.8 V), and the output voltage of IL goes to 0, thereby making it possible to recharge progressively the capacitor with the current $I_2$, whose value is approximately equal to 3 $\mu$A, to a value greater than the voltage $V_R$, then the value of the voltage VAO returns to zero (FIG. 12a), the output voltage of IL goes to 1, and $I_2$ becomes zero again.

Given that $I_1 t_e = I_2 T_s = CU_c$ = constant, the ratio $I_1/I_2$ can be deduced which is equal, for example, to 1000 where $I_1 = 3$ mA and $I_2 = 3$ $\mu$A.

Thus $T_s/t_e = 1000$.

Therefore, for each width or duration $t_e$ of a pulse, an expanded time $T_s$ is obtained at the output of the comparator, which time can be determined conventionally so as to deduce therefrom the width $t_e = T_s/1000$.

The time $T_s$ is, for example, determined by the resistance of the resistor R10 in the circuit shown in FIG. 13.

The circuit shown in FIG. 13 is an example of a circuit performing the above-described time expander function.

The circuit includes a resistor R7 through which the signal $IEX_1$ passes (FIGS. 9 and 10) connected to a point B to which firstly a diode D1 connected in series with a resistor R8 and secondly the base of an NPN transistor 130 are also connected.

The emitter of the NPN transistor is connected to ground via a resistor R9, while the collector is connected to a point C.

A logic level 1 on the signal $IEX_1$ defines a potential B in the network R7, D1, R8, to which potential the base of the transistor 130 is subjected. The current is thus substantially defined by the formula $i=(V_B-Vbe)/R9$, where $V_{be}$ designates the base-emitter voltage of the transistor 130, i.e. about 0.65 V.

A capacitor C3 is connected via one of its plates to the point C, and to the inverting input of a comparator 132 fed with a voltage $V_{dd}$, the inverting input of the comparator being subjected to a reference voltage $V_R$.

The output is sent firstly to a measurement timer associated with a microprocessor not shown in the figures, and secondly to a resistor R10.

The resistor R10 is connected to a point D to which firstly a diode D2 connected in series with a resistor R11 and secondly the base of a transistor 136 are also connected.

The emitter of this PNP transistor 136 is connected to a resistor R12 while the collector is connected to above-mentioned point C.

The circuit is fed with a voltage $V_{dd}$.

This circuit operates in the manner indicated above with reference to FIGS. 12a and 12b.

The current generators $G_1$ and $G_2$ shown in FIG. 12b are respectively replaced with the transistors 130 and 136, while a diode and a resistor connected together in series are added in association with each of the transistors so as to compensate for the temperature drift of the emitter/base diodes of the transistors.

Thus, after expanding the time corresponding to the sum of the widths of the sixteen pulses of the signal $IEX_1$, the time $t_1$ is obtained which is characteristic of the propagation of the ultrasonic signal emitted by the transducer $T_1$ towards the transducer $T_2$ situated downstream (FIG. 1).

About 40 ms after the start of emission of the signal from the transducer $T_1$, the reset signal R is generated so as to reinitialize the logic units for forming the signals IEX.

The transducer $T_2$ then emits an ultrasonic signal towards the transducer $T_1$ on being excited by an excitation signal $SE_2$ of frequency equal to 1 MHz and generated by the sequencer 24.

The switching unit controlled by the microprocessor is switched over so that the switch 44 is open and the switch 46 is closed.

The transducer $T_1$ receives the ultrasonic signal that has propagated from downstream to upstream about 90 ms after the instant at which emission is started, and the signal is conditioned by the inverter 48 to obtain the signal $SIG_2$ which has the waveform indicated in FIG. 5a.

The unit described with reference to FIG. 6 remains activated in the state in which it was when the clock signal CLS was selected, and the unit thus delivers the signal CLS.

The signal $SIG_2$ is synchronized with the signal C4M so as to generate the signal $SIG_{2S}$.

The signal $SIG_2$ is sent to the clock input CK of the bistable 118 (FIG. 9), while the selected clock signal CLS is sent to the clock inputs CK of the bistables 110 and 120. A portion of the signal $SIG_2$ is selected by the signal ERES which enables the D input of the bistable 110. The unit shown in FIG. 9 operates in a manner analogous to the manner described with reference to forming the signal $IEX_1$, and the signal $IEX_2$ is thus generated in this way.

Figure 14:
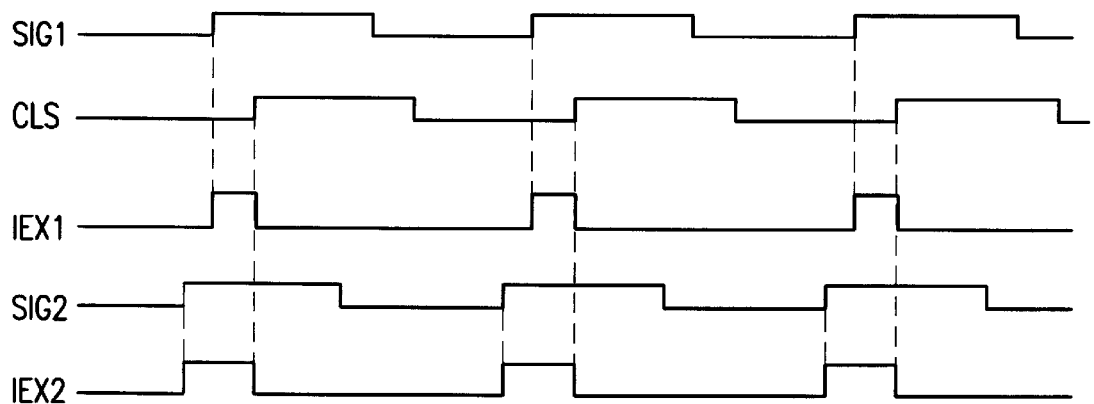
FIG. 14 shows the various signals $SIG_1$, $SIG_2$, $IEX_1$, and $IEX_2$.

The signals $IEX_1$ and $IEX_2$ are shown in FIG. 14.

They are shown one above the other for convenience but clearly they are not simultaneous in time.

The signal $IEX_2$ is then processed by the time expansion circuit shown in FIG. 13, in a manner identical the manner described above with reference thereto.

The time $t_2$ characteristic of the propagation of the ultrasonic signal emitted by the transducer $T_2$ towards the transducer $T_1$ is thus determined as described above with reference to time $t_1$.

The difference between these times $t_2-t_1$ is then computed by the microprocessor, and the fluid flow rate Q which is proportional to this difference is then deduced from the following formula: $Q=K (t_2-t_1)/C$, where K is a term that takes into account the geometry of the meter, and C is a correction term related to the propagation speed of sound in water.

The flow rate Q may also be put in the form $Q=2LS(t_2-t_1)/(t_1+t_2)^2$ with the geometry of FIG. 1, in which L and S are respectively the length of the tube and the through sectional area of the tube.

With L=10 cm, S=1 cm$^2$, and $t_1+t_2=160 \mu s$, Q=1406 liters per hour (l/h).

Advantageously, the signal CLS is a temporary time reference which is used as an intermediate reference to determine the times $t_1$ and $t_2$. This reference is then removed when the difference $t_1-t_2$ is determined, which difference gives the desired basis for measurement.

This method does not need the phase of the signal to be reconstructed to determine the propagation time of said signal, which is less costly in terms of energy.

In addition, this method is more flexible than those used in the prior art because the time reference is created, and it is not therefore necessary to take the emission signal into account.

The method of the invention is reliable because it operates in digital manner, which is also very accurate.

For an emission frequency of 1 MHz, the propagation time of an ultrasonic signal is approximately in the range 70 ms to 80 ms, and the phase rotation of the emitted signal varies in the range 140π to 160π.

If, for example, the upstream-to-downstream propagation time is equal to 70 $\mu s$, which corresponds to a phase rotation of the signal of 140π, then the downstream-to-upstream propagation time may be equal to 70 $\mu s$+500 $\mu s$, and the corresponding phase rotation is equal to 140π+π for a maximum water flow rate.

For metering domestic water, the maximum flow rate is, for example, equal to 2 cubic meters per hour (m$^3$/h) with a pipe 12 of diameter equal to 10 mm.

This means that, in this case, the difference between the expanded times $t_2-t_1$ is equal to 500 ns, which corresponds to a phase offset of π.

Four clock signals $CK_i$ such as those described above suffice to determine a difference between the times $t_2-t_1$ equal to 500 ns with minimum energy consumption.

When the phase difference is greater than π, it is essential to increase the number of clock signals.

It is possible to increase the number of clock signals $CK_i$ so as to increase the dynamic range of the flow rate measurement, but the energy consumption would be higher.

By modifying the emission frequency of the ultrasonic signals, it is possible either to increase measurement accuracy, and thus to reduce the dynamic range of the meter (increased frequency) or to increase the dynamic range of the meter, but while reducing the measurement accuracy (reduced frequency).

Figure 15:
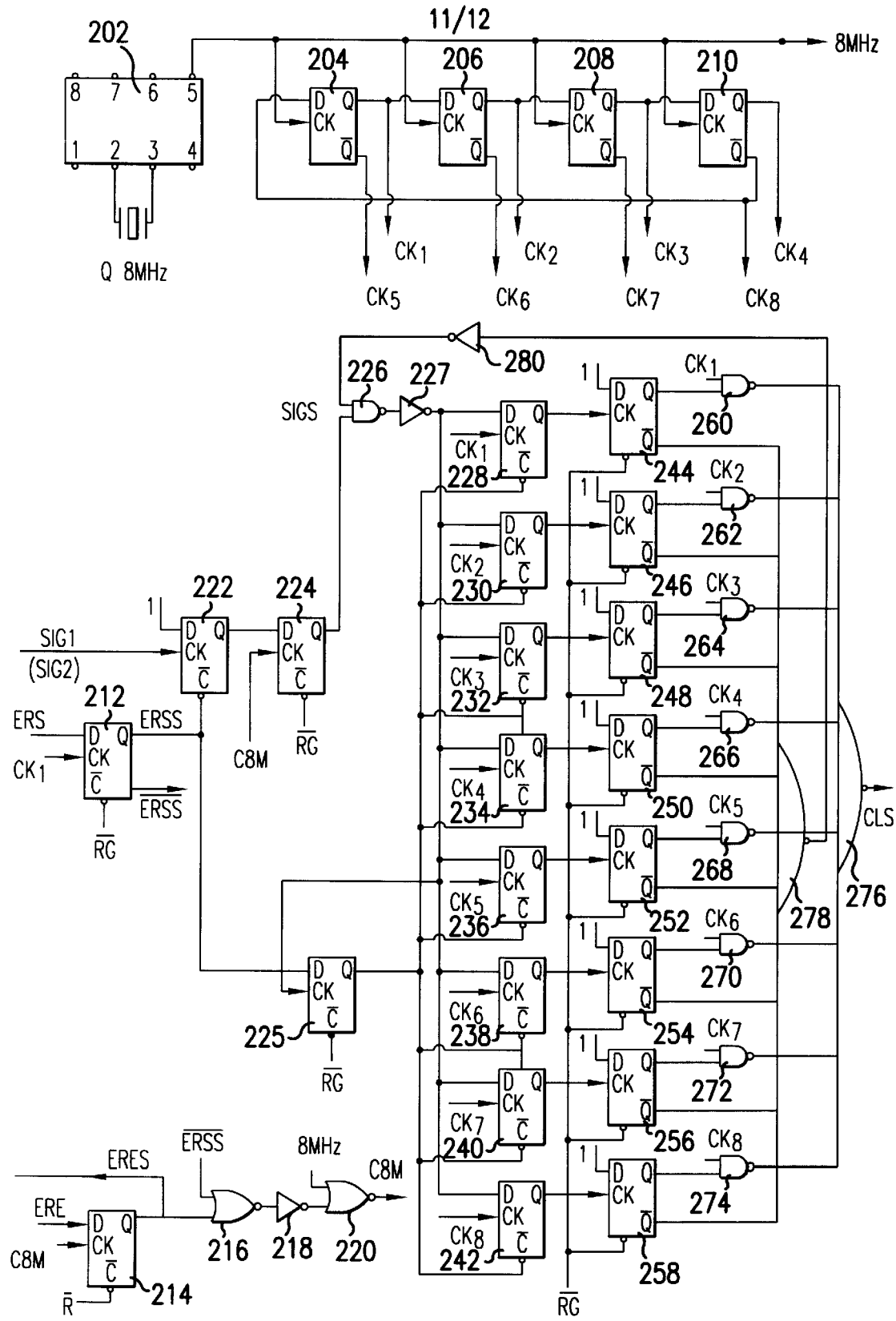
FIG. 15 is a diagrammatic view of the portion of the apparatus shown in FIG. 6 in a second embodiment of the invention.

A second embodiment is shown in FIG. 15, and is described below.

Figure 16:
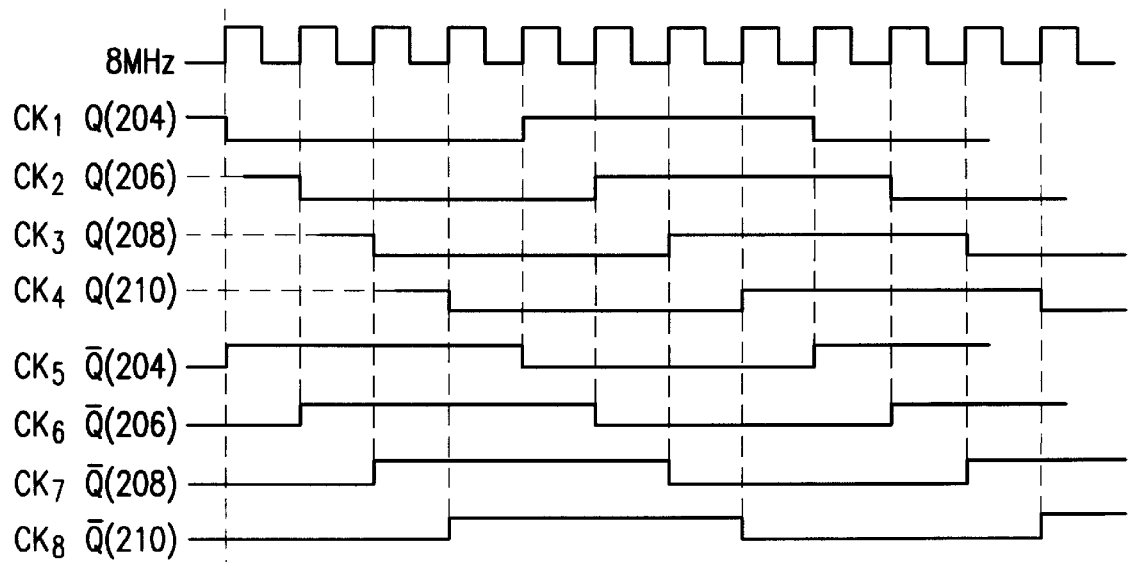
FIG. 16 shows the waveforms of the eight clock signals $CK_i$ relative to one another.

As shown in FIG. 15, the measurement apparatus comprises means 200 for forming eight clock signals $CK_i$, where i=1 to 4. FIG. 16 shows the waveforms of the signals $CK_i$ formed.

These means include a crystal oscillator 202 of frequency equal to 8 MHz. This oscillator delivers a clock signal which is applied to the clock inputs CK of four D-type bistables 204, 206, 208, 210 forming a divider.

The $\overline{Q}$ output of the bistable 210 is connected to the D input of the bistable 204, and the Q outputs of the bistables 204, 206, and 208 are connected to the D inputs of respective ones of the bistables 205, 208, and 210.

Assuming that the signal $CK_4$ is at 0, when a rising edge of the clock signal at 8 MHz arrives, then the clock signal $CK_1$ delivered by the Q output of the bistable 204 goes to 1 and the D input of the bistable 206 thus also takes the value 1.

The clock signal $CK_5$ delivered by the $\overline{Q}$ output of the bistable 204 therefore goes to 0.

On the following rising edge of the clock signal at 8 MHz, the clock signal $CK_2$ delivered by the Q output of the bistable 206 goes to 1.

Thus, the clock signal $CK_6$ delivered by the $\overline{Q}$ output of the bistable 206 goes to 0.

The following rising edge of the clock signal at 8 MHz causes the clock signal $CK_3$ delivered by the Q output of the bistable 208 to go to 1, while the clock signal $CK_7$ delivered by the $\overline{Q}$ output of said bistable goes to 0.

The following rising edge of the clock signal at 8 MHz causes the clock signal $CK_4$ delivered by the Q output of the bistable 210 to go to 1, thereby causing the clock signal $CK_8$ delivered by the $\overline{Q}$ output of said bistable to go to 0, and thus the D input of the bistable 204 also takes the value 0.

On the following rising edge of the clock signal at 8 MHz, the clock signal $CK_1$ returns to zero, while the signal $CK_5$ goes to 1, and thus the D input of the bistable 206 also goes to 0.

When the next rising edge of the clock signal at 8 MHz arrives, the clock signal $CK_2$ delivered by the Q output of the bistable 206 goes to 0, and the signal $CK_6$ thus goes to 1.

When another rising edge of the clock signal at 8 MHz appears, the clock signal $CK_3$ delivered by the bistable 208 goes to 0, and the clock signal $CK_7$ thus goes to 1.

The following rising edge of the clock signal at 8 MHz causes the clock signal $CK_4$ to go to 0 and the clock signal $CK_8$ to go to 1, thereby forcing the D input of the bistable 204 to 1.

On another rising edge of the clock signal at 8 MHz, the clock signal $CK_1$ goes to 1, and the clock signal $CK_5$ thus goes to 0. A following rising edge of the clock signal at 8 MHz causes the clock signal $CK_2$ to go to 1, and thus causes the clock signal $CK_6$ to go to 0.

The next rising edge of the clock signal at 8 MHz causes the clock signal $CK_3$ to go to 1 and the clock signal $CK_7$ to go to 0.

On the following rising edge of the clock signal at 8 MHz, the clock signal $CK_4$ goes to 1 and the clock signal $CK_8$ goes to 0, thereby forcing the D input of the bistable 204 to 0.

Thus the eight clock signals $CK_1$, $CK_2$, $CK_3$, $CK_4$, $CK_5$, $CK_6$, $CK_7$, and $CK_8$ are formed.

These signals are of the same frequency as the excitation signals $SE_1$ and $SE_2$ for exciting the transducers (1 MHz), which excitation signals are created, for example, on the basis of the clock signal $CK_1$. The signals are mutually phase shifted by $\pi/4$ and are in a fixed phase relationship relative to the excitation signals of the transducers.

In addition, these signals have transitions between a logic value 0 and a logic value 1.

As shown in FIG. 3, a "synchronization" signal ERS is generated by the decoder 28 of the sequencer 26, and its waveform is shown in FIGS. 5 and 5a.

Its logic value is at 0, and after a lapse of time equal to 95 ms, its value goes to 1 when the received signal is situated in its central portion which is less disturbed that the beginning or the end of said received signal. This signal triggers the beginning of the stage in which a clock signal $CK_i$ is selected.

With reference to FIG. 15, the signal ERS is sent to the D input of a D-type bistable 212. This bistable is capable of generating at its Q output a signal ERSS which corresponds to the signal ERS synchronized with the clock signal $CK_1$ which is sent to the clock input CK of the bistable 212.

The signal $CK_1$ has been chosen arbitrarily.

A signal ERE is generated by the decoder 28 of the sequencer 26 (FIG. 3), and its waveform is shown in FIG. 5b.

Its logic value is at 0 and, 2 ms after the signal ERS goes to 1, its value goes to 1. This signal triggers the beginning of the measurement stage.

With reference to FIG. 15, the signal ERE is sent to the D input of a D-type bistable 214 whose $\overline{C}$ (clear) input is connected to a signal $\overline{R}$ which reinitializes it at the beginning of a measurement.

The Q output of the bistable 60 is connected to one of the inputs of a logic gate 216 of the NOR type, the other input receiving the signal $\overline{ERSS}$.

The output of this gate 216 is connected to an inverter 218 whose output is connected to one of the inputs of a logic gate 220 of the NOR type, the other input receiving the clock signal at 8 MHz.

A signal C8M of frequency equal to 8 MHz is delivered at the output of this gate 220. The signal C8M is reinjected into the clock input CK of the bistable 214. The signal C8M is triggered by the signal $\overline{ERSS}$ going to zero, and it is inhibited when the signal ERE synchronized by the signal C8M appears.

The Q output of the bistable 214 delivers a signal ERES which corresponds to the signal ERE synchronized with the signal C8M. This signal serves to enable the measurement unit.

The synchronized signal ERSS is sent to the $\overline{C}$ input of a D-type bistable 222. The signal SIG ($SIG_1$ or $SIG_2$) is sent to the clock input CK of this bistable whose D input is at 1.

The Q output of the bistable 222 is connected to the D input of a D-type bistable 224.

The signal C8M is sent to the clock input CK of the bistable 224, and the $\overline{C}$ input is connected to a signal $\overline{RG}$ whose purpose is to initialize the bistable at the beginning of a fall measurement cycle.

When the signal ERSS at the Q output of the bistable 212 goes to 1, the first rising edge of the conditioned signal $SIG_1$ (or $SIG_2$) causes the Q output of the bistable 222 to go to 1, thereby allowing the Q output of the bistable 224 to go to 1 on the first rising edge of the signal C8M.

The resulting signal $SIG_{1S}$ corresponds to the signal $SIG_1$ synchronized with the signal C8M.

The signal ERSS is also sent to the D input of a D-type bistable 225.

The $\overline{C}$ input of the bistable 225 receives the above-mentioned signal RG.

The common signal $SIG_{1S}$ is also sent to one of the inputs of a logic gate 226 of the NAND type and whose output is directed to an inverter 227 which sends the inverted signal to the D inputs of eight D-type bistables 228, 230, 232, 234, 236, 238, 240, 242.

The $\overline{C}$ input of each bistable is connected to the Q output of the bistable 225.

When the signal ERSS is at 1, the first rising edge of the signal $SIG_{1S}$ triggers the bistable 225 and causes its Q output to go to 1.

The first rising edge of $SIG_{1S}$ that appears after ERSS has gone to 1 releases the $\overline{C}$ inputs of the eight bistables 228–242.

Eight other D-type bistables 244, 246, 248, 250, 252, 254, 256, 258 receive respective ones of the Q outputs of the bistables 228–242 at their clock inputs CK.

The D inputs of the bistables 244–258 are set to 1 permanently, and their $\overline{C}$ inputs are connected to the common initialization signal RG.

The $\overline{Q}$ outputs of the bistables 244–258 are connected to respective ones of eight logic gates 260, 262, 264, 266, 268, 270, 272, and 274 of the NAND type, the other inputs of these gates receiving respective ones of the clock signals $CK_1$ to $CK_8$. The outputs of the logic gates 260–274 are connected to respective ones of eight inputs of a logic gate 276 of the NAND type.

The $\overline{Q}$ outputs of the bistables 244–258 are connected to respective ones of four inputs of a logic gate 278 of the NAND type whose output is inverted by a logic inverter 280 and is then reinjected into the second input of the logic gate 226.

Whenever a rising edge of the signal $SIG_{1S}$ is identified by the eight bistables 228 to 242, they are activated, and they receive respective ones of the clock signals $CK_1$ to $CK_8$ at their clock inputs CK.

The common signal $\overline{RG}$ is at 1 (initialization at the beginning of the measurement), the bistables 244 to 258 are rendered active, and they are thus sensitive to the Q outputs of the bistables 228 to 242.

The first transition or rising edge of the first clock signal that arrives immediately after the rising edge of the signal $SIG_{1S}$ appears triggers the Q output of the bistable receiving the clock signal in question.

For example, if $CK_5$ is the selected clock signal because it is closest in time to $SIG_{1S}$, this signal being selected by the bistable 236 causes the Q output of the bistable to go to 1, thereby also causing the Q output of the corresponding bistable 252 to go to 1.

The Q outputs of the other bistables 228 to 234 and 238 to 242 are always at 0.

The $\overline{Q}$ output of the bistable 252 is then at 0 and thus causes the output of the logic gate 278 to go to 1. The inverted signal arriving at the second input of the logic gate 226 is then at 0, which locks the gate and causes the common signal output by the gate and interconnecting the D inputs of the bistables 228 to 242 to go to 0.

In this way, the bistables 228 to 242 become insensitive to the clock signals $CK_i$, and the Q outputs of the bistables remain at 0.

This makes it possible to prevent other clock signals from being selected, and, in this way, the selected clock signal $CK_5$ is stored.

Since the Q output of the bistable 252 is at 1, the signal $CK_5$ is released by the logic gate 268 and is applied to one of the four inputs of the logic gate 276. The other inputs of this gate 276 are at 1, because of the 0 state of the Q outputs of the bistables 244 to 250 and 254 to 258, and therefore the gate 276 delivers the signal $CK_5$ which is referred to below as "CLS". The signal CLS corresponds to the clock signal selected by the above-described circuit.

Since the signal $SIG_1$ is synchronized by the signal C8M, it is possible to prevent the edges of the signals $SIG_1$ and CLS from appearing simultaneously.

Everything described above with reference to FIGS. 9 to 14 remains applicable to the above-described second embodiment.

Figure 17:
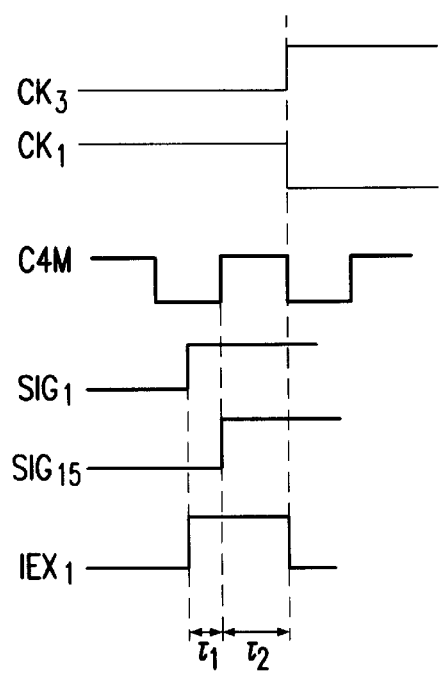
FIG. 17 shows the waveforms of the signals $CK_1$, $CK_3$, C4M, $SIG_1$, $SIG_{1S}$, and $IEX_1$.

By way of example, when four clock signals $CK_i$ are used with a frequency of 4 MHz, and when the signal $SG_1$ is synchronized with the signal C4M by means of the bistable 70, the signals $CK_1$, $CK_3$, C4M, $SIG_1$, $SIG_{1S}$, and $IEX_1$ may, for example, have the waveforms shown in FIG. 17.

Thus, when it is desired to measure the width of the pulse formed between a rising edge of the signal $SIG_1$ and the first rising edge of the of the clock signal $CK_i$ which occurs immediately afterwards (i.e. $CK_3$ in the example chosen), it can be observed that the time width of the pulse (downstream launch) can be subdivided into two portions: a random first portion of duration $\tau_1$ which is due to the signal $SIG_1$ being synchronized with the signal C4M, the duration $\tau_1$ lying in the range 0 ns to 250 ns depending on the relative position of the two signals $SIG_1$ and C4M, and a fixed second portion of duration $\tau_2$ which corresponds to one half-period of the signal C4M, i.e. 125 ns.

The time width of the pulse is thus 375 ns at most.

When it is desired to measure the width of the pulse formed between a rising edge of the signal $SIG_2$ and the first rising edge of the selected clock signal $CK_3$ (upstream launch), the time width of the pulse is, at its maximum, equal to 1 μs-ϵ, i.e. about 970 ns, where 1 ms represents the period of the signal at 1 MHz and ϵ is a safety term that guarantees that the bistables 118 and 120 shown in FIG. 9 operate correctly.

As a result, by taking the difference between the time widths of the two preceding pulses, a maximum of 595 ns is obtained.

When using eight clock signals $CK_i$ with a frequency of 8 MHz, the time width of the pulse obtained for the upstream launch is still the sum of two terms $\tau_1$ and $\tau_2$, but $\tau_1$ then lies in the range 0 ns to 125 ns (due to synchronization with the signal C8M), and $\tau_2$ is equal to 62.5 ns (corresponding to one half-period of the signal C8M), thereby setting the maximum for the time width of the pulse at 187.5 ns.

The time width of the pulse obtained for the downstream launch remains unchanged (970 ns), and the maximum difference between the two terms is then 782.5 ns.

This corresponds to increasing the dynamic range of the measuring apparatus by 1.3 (=782.5/595).

Thus, for example, if the range of flow rates covered by the measurement apparatus with four clock signals extends from 0 l/h to 1500 l/h, then the measurement apparatus with eight clock signals makes it possible to cover a range extending to 1950 l/h.

It should be noted that, in order to increase the dynamic range of the measurement apparatus using at least four clock signals, it is possible to replace the logic delay corresponding to time $\tau_2$ with a much shorter delay which is still compatible with the technology of the logic circuit used. For example, this time may be obtained by means of a cascade of inverters, or by means of an RC circuit followed by a trigger circuit.

With the invention, an average of five cycles (one cycle corresponding to a downstream launch and an upstream launch) suffices to obtain a resolution of 50 ps.

What is claimed is:

1. A method of measuring the flow rate of a flowing fluid, the method consisting in causing two ultrasonic signals to propagate consecutively in opposite directions between two ultrasonic transducers spaced apart in the flow direction of the fluid, each transducer receiving a respective ultrasonic signal $SIG_1$, $SIG_2$, said method consisting in: forming n clock signals $CK_i$, where i=1 to n, and n≧4, which signals include transitions, are at mutual phase offsets of 2π/n, are in a fixed relationship relative to an excitation signal for exciting the transducers, and are of the same frequency as said excitation signal; choosing a characteristic portion of a period of a first received signal $SIG_1$ received in one propagation direction; selecting the first transition of the clock signal that occurs immediately after said characteristic portion appears; storing the clock signal, referred to as "CLS"; determining the time $t_1$ corresponding to the sum, over an integer number m of consecutive periods, of the times elapsed between the instant at which the characteristic portion of each of the m periods of the signal $SIG_1$ appears, and the instant at which the first transition of the following signal CLS appears; identifying the same characteristic portion over m consecutive periods of a second received signal $SIG_2$ received in the opposite propagation direction; determining the time $t_2$ corresponding to the sum of the times elapsed between the instant at which the characteristic portion of each of the m periods of the signal $SIG_2$ appears and the instant at which the first transition of the following signal CLS appears; taking the difference $|t_2-t_1|$; and deducing therefrom the fluid flow rate Q which is proportional to $|t_2-t_1|$.

2. A method according to claim 1, in which m=1.

3. A method according to claim 1, in which m≠1, and the period over which the characteristic portion is chosen corresponds to the first of the m consecutive periods of the first received signal $SIG_1$.

4. A method according to claim 1, in which m≠1, and the period over which the characteristic portion is chosen precedes the m consecutive periods of the first received signal $SIG_1$.

5. A method according to claim 1, consisting in conditioning the received signals $SIG_1$ and $SIG_2$ in the form of squarewave pulses.

6. A method according to claim 5, in which the characteristic portions of the periods of the received signals correspond to the rising edge of each pulse.

7. A method according to claim 5, in which the characteristic portions of the received signals correspond to the falling edge of each pulse.

8. A method according to claim 1, in which the clock signals $CK_i$ are in the form of squarewave pulses.

9. A method according to claim 1, in which the first transition of the clock signal CLS is a rising edge.

10. A method according to claim 1, in which the first transition of the clock signal CLS is a falling edge.

11. A method according to claim 1, consisting in taking the respective differences $SIG_1$-CLS and $SIG_2$-CLS between the signals so as to obtain the respective signals $IEX_1$ and IEX$_2$ which make it possible to determine the respective times t$_1$ and t$_2$.

12. A method according to claim 11, in which the received signals SIG$_1$ and SIG$_2$ are conditioned in the form of squarewave pulses, in which the clock signals CK$_i$ are in the form of squarewave pulses, in which the signals IEX$_1$ and IEX$_2$ are in the form of squarewave pulses, and in which the cumulative duration of all of the pulses is expanded to determine the respective times t$_1$ and t$_2$.

13. A method according to claim 1, in which the clock signal CK$_1$ is in phase with the excitation signal for exciting the transducers.

14. A method according to claim 1, consisting in forming four clock signals CK$_i$, where i=1 to 4.

15. A method according to claim 1, consisting in forming eight clock signals CK$_i$, where i=1 to 8.

16. A method according to claim 1, consisting in forming, for each received signal, a signal SIG$_S$ that is phase offset relative to the clock signals CK$_i$.

17. A method according to claim 16, in which the signal SIG$_S$ is phase offset by $\pi/n$ relative to the clock signals CK$_i$.

18. Apparatus for measuring the flow rate of a flowing fluid, said apparatus comprising:
at least two ultrasonic transducers spaced apart in the flow direction of the fluid;
means for forming an excitation signal for exciting the transducers; and
means for receiving two ultrasonic signals SIG$_1$ and SIG$_2$ emitted consecutively by respective ones of said transducers in opposite directions;
said apparatus further comprising:
means for forming n clock signals CK$_i$, where i=1 to n, and n≧4, which signals include transitions, are mutually phase offset by $2\pi/n$, are in a fixed relationship relative to the excitation signal, and are of the same frequency as said excitation signal;
means for identifying a characteristic portion of a period of the first received signal SIG$_1$;
means for selecting the first transition of the clock signal CK$_i$ that occurs immediately after said characteristic portion appears;
means for storing the clock signals referred to as "CLS";
means for determining the time t$_1$ corresponding to the sum, over an integer number m of consecutive periods, of the times elapsed between the instant at which the characteristic portion of each of the m periods of the signal SIG$_1$ appears, and the instant at which the first transition of the following signal CLS appears;
means for identifying the same characteristic portion over m consecutive periods of the second received signal SIG$_2$;
means for determining the time t$_2$ corresponding to the sum of the times elapsed between the instant at which the characteristic portion of each of the m periods of the signal SIG$_2$ appears and the instant at which the first transition of the following signal CLS appears; and
means for taking the difference |t$_2$−t$_1$| and for deducing therefrom the fluid flow rate Q which is proportional to t$_2$−t$_1$.

19. Apparatus according to claim 18, in which m=1.

20. Apparatus according to claim 18, in which m≠1, and the period over which the characteristic portion is chosen corresponds to the first of the m consecutive periods of the first received signal SIG$_1$.

21. Apparatus according to claim 18, in which m≠1, and the period over which the characteristic portion is chosen precedes the m consecutive periods of the first received signal SIG$_1$.

22. Apparatus according to claim 18, in which the means for forming the clock signals CK$_i$ comprise a crystal oscillator followed by n/2 D-type bistables forming a divider, and thus making it possible to obtain signals CK$_i$ that are mutually phase offset by $2\pi/n$.

23. Apparatus according to claim 18, in which the means for selecting the first transition of the clock signal comprise n "selection" D-type bistables, the D input of each of the bistables being connected to the common received signal SIG$_1$ or SIG$_2$, the clock input CK of each of the bistables receiving a respective clock signal CK$_i$ that is different from one bistable to another, it being possible to activate the bistables via reset-to-zero inputs RAZ in a manner such that when the reset inputs RAZ of the bistables are at 1 and when the common signal is at 1, said bistables are sensitive to the signals CK$_i$.

24. Apparatus according to claim 18, in which the means for selecting the first transition of the clock signal comprise n logic gates, each of which receives the common received signal SIG$_1$ or SIG$_2$ via a respective input, and n monostable circuits, each of which receives a different clock signal CK$_i$, and has its output sent to a respective one of the other inputs of the n logic gates.

25. Apparatus according to claim 23, in which the means for storing the clock signal CLS comprise firstly n storage D-type bistables, each of which receives, as a clock input CK, the Q output of a respective selection bistable, and, secondly a NAND logic gate having n inputs, each of which is connected to the $\overline{Q}$ output of a respective storage bistable, the D input of each of the storage bistables being permanently at 1, and the first signal received at the clock input CK of one of the bistables activating the storage function thereof by causing the Q output of said bistable to go to 1, and its $\overline{Q}$ output to go to 0, thereby activating a locking circuit for locking the common received signal SIG$_1$ or SIG$_2$.

26. Apparatus according to claim 25, in which each one of n NAND logic gates receives a clock signal CK$_i$ and the Q output of the corresponding storage bistable via respective ones of its inputs, the output of each of the gates being connected to a respective one of the inputs of the NAND logic gate having n inputs, one of the n logic gates releasing the associated clock signal CK$_i$ when the storage function of the corresponding storage bistable is activated.

* * * * *